(12) United States Patent
Tachibana

(10) Patent No.: US 8,625,142 B2
(45) Date of Patent: Jan. 7, 2014

(54) PRINTING APPARATUS AND CONTROL METHOD THEREOF AND PROGRAM

(75) Inventor: Yoshiro Tachibana, Inagi (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/617,601

(22) Filed: Sep. 14, 2012

(65) Prior Publication Data

US 2013/0094052 A1 Apr. 18, 2013

Related U.S. Application Data

(63) Continuation of application No. 12/434,050, filed on May 1, 2009, now Pat. No. 8,335,003.

(30) Foreign Application Priority Data

Jul. 1, 2008 (JP) .................................. 2008-172646

(51) Int. Cl.
*G06F 15/00* (2006.01)

(52) U.S. Cl.
USPC .......................................................... 358/1.15

(58) Field of Classification Search
USPC .......................................................... 358/1.15
See application file for complete search history.

(56) References Cited

U.S. PATENT DOCUMENTS

| | | | |
|---|---|---|---|
| 2002/0186413 A1* | 12/2002 | Ito | 358/1.18 |
| 2004/0170443 A1 | 9/2004 | Maeshima | |
| 2007/0229896 A1 | 10/2007 | Fujimori et al. | |

FOREIGN PATENT DOCUMENTS

| | | |
|---|---|---|
| JP | 10-322483 A | 12/1998 |
| JP | 2005-151415 A | 6/2005 |
| JP | 2006039938 A | 2/2006 |
| JP | 2007-272901 A | 10/2007 |
| JP | 2008-085400 A | 4/2008 |

OTHER PUBLICATIONS

Japanese office action cited in Japanese counterpart application No. JP2008-172646, dated Mar. 22, 2013.
Japanese Office Action for corresponding JP 2008-172646, mail date Oct. 5, 2012.

* cited by examiner

*Primary Examiner* — Saeid Ebrahimi Dehkordy

(74) *Attorney, Agent, or Firm* — Rossi, Kimms & McDowell LLP

(57) ABSTRACT

It is determined whether or not a change request for changing an array of a plurality of items of job information on a job list screen to a second array being different from a first array is inputted via a user interface. If it is determined that the change request is inputted, a job list screen is displayed in which the array of the plurality of items of job information is changed to the second array. Display contents of the user interface are changed in response to a user operation with respect to a print job displayed on the job list screen. The job list screen in the second array, or the job list screen in the first array, is redisplayed, based on the nature of the change request.

10 Claims, 19 Drawing Sheets

FIG. 14

USER INFORMATION MANAGEMENT TABLE

| USER ID | USER NAME | PASSWORD | JOB LIST DISPLAY FORMAT |
|---|---|---|---|
| 1 | suzuki | ********** | ASCENDING ORDER OF DATE/TIME |
| 2 | honda | ********** | DESCENDING ORDER OF JOB NAMES |
| 3 | toyota | ********** | ASCENDING ORDER OF DATE/TIME |
| 4 | kawasaki | ********** | DESCENDING ORDER OF JOB NAMES |
| 5 | yamaha | ********** | DESCENDING ORDER OF DATE/TIME |
| 6 | null | null | ASCENDING ORDER OF DATE/TIME |
| 7 | null | null | ASCENDING ORDER OF DATE/TIME |
| 8 | null | null | ASCENDING ORDER OF DATE/TIME |
| · · · · | | | |

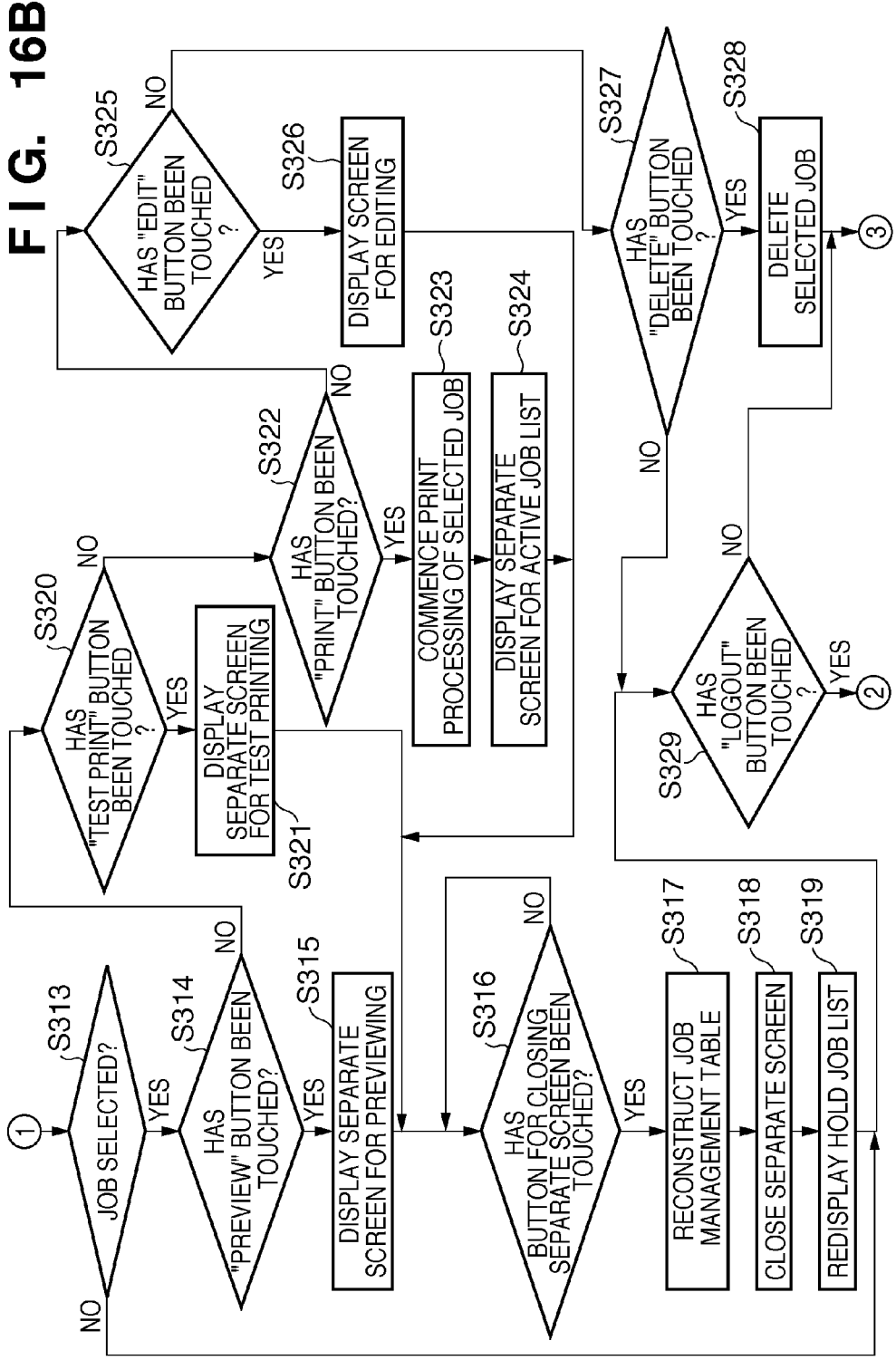

PRINTING APPARATUS AND CONTROL METHOD THEREOF AND PROGRAM

CROSS-REFERENCE TO RELATED APPLICATIONS

This is a continuation of U.S. patent application Ser. No. 12/434,050, filed May 1, 2009, which is based on and claims priority from Japanese Application No. JP2008-172646, filed Jul. 1, 2008. The disclosure of the priority applications, in their entirety, including the drawings, claims, and the specifications thereof, are herein incorporated by reference.

BACKGROUND OF THE INVENTION

1. Field of the Invention

The present invention relates to a printing apparatus that causes a user interface to display a job list screen displaying a plurality of items of job information regarding a plurality of print jobs in a predetermined array, a control method thereof, and a program.

2. Description of the Related Art

A print management system is known in which a plurality of printers, a plurality of client computers, and a print management server are connected via a network. For such a print management system, a method is proposed in which a single panel for listing all managing print jobs is provided at a print management server so as to enable a dedicated operator to promptly and accurately identify a status of a print job (refer to Japanese Patent Laid-Open No. 2007-272901).

Japanese Patent Laid-Open No. 2007-272901 also proposes a method for sorting an order of print jobs on the single panel provided at the print management server so as to enable the operator to readily find a desired print job or information related thereto.

However, with the conventional technique described above, when switching from a screen on which all print jobs are listed to another screen, a display format, according to which the print jobs were sorted, is not retained. Consequently, it is difficult to find a desired print job on a screen listing all print jobs after switching to another screen. Therefore, an instruction for re-sorting the print jobs is required, which in turn disadvantageously requires an operation by an operator.

In addition, in a case where a print management server is shared by a plurality of dedicated operators or the like, demands may arise for displaying print jobs in a state where a display order has been set for each operator. However, conventionally, such demands can not be satisfied.

SUMMARY OF THE INVENTION

An aspect of the present invention is to eliminate the above-described problems with the conventional technology.

According to an aspect of the present invention, after a display array of job information of print jobs on the job list screen is changed, if the job list screen is switched to another screen by a user operation and then the job list screen is restored, then a display array of job information of print jobs on the job list screen is restored to the display array before switching to the another screen. Accordingly, a printing apparatus with superior operability, a control method thereof, and a program can be provided.

According to an aspect of the present invention, there is provided a printing apparatus for causing a user interface to display a job list screen displaying a plurality of items of job information regarding a plurality of print jobs in a first array, the printing apparatus comprising: a determination unit that determines whether or not a change request for changing an array of the plurality of items of job information on the job list screen to a second array being different from the first array is inputted via the user interface; an array change unit that displays the job list screen in which the array of the plurality of items of job information is changed to the second array, in a case that the determination unit determines that the change request is inputted; a display changeover unit that changes display contents of the user interface in response to a user operation with respect to a print job displayed on the job list screen; and a display control unit that redisplays the job list screen in the second array upon the conclusion of processing due to the user operation in a case that the change request is inputted prior to the user operation, and redisplays the job list screen in the first array in a case that the change request is not inputted prior to the user operation.

Further features and aspects of the present invention will become apparent from the following description of exemplary embodiments, with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 14 is a diagram describing an example of a user information management table for managing user information of the MFP according to the present embodiment;

FIGS. 16A and 16B are flowcharts describing display processing of a hold job list by the MFP controller and processing in response to an input made on a touch panel by an operator, according to the present embodiment.

DESCRIPTION OF THE EMBODIMENTS

Embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
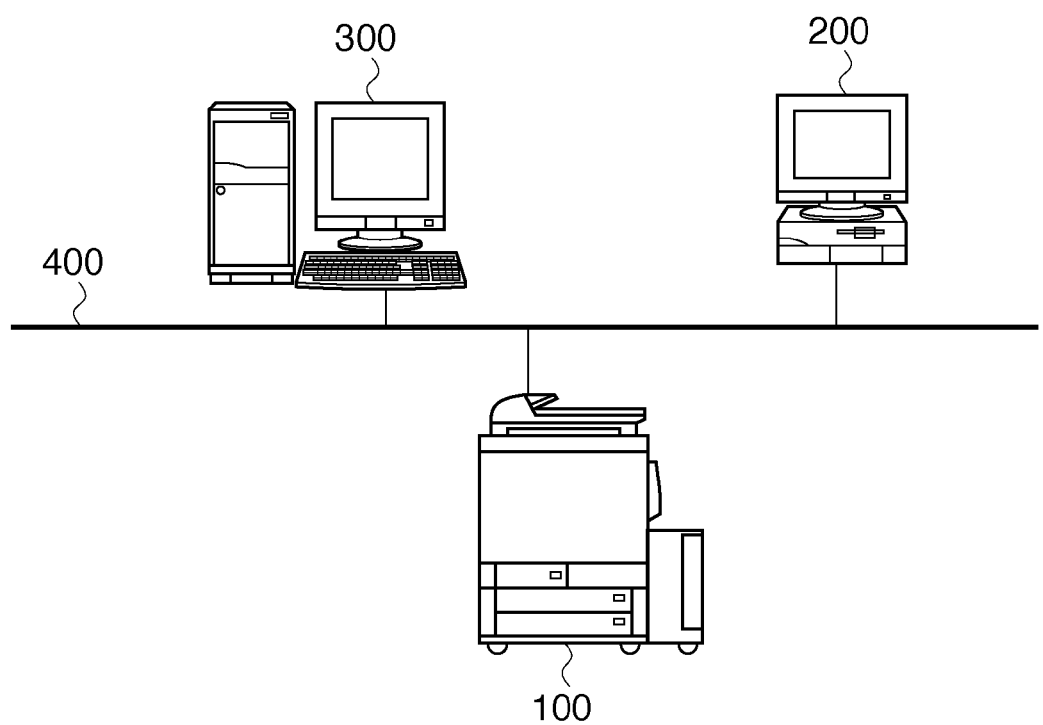
FIG. 1 is a system configuration diagram of an entire print management system according to an exemplary embodiment of the present invention.

FIG. 1 is a system configuration diagram of an entire print management system according to an exemplary embodiment of the present invention.

In FIG. 1, a multi function peripheral (MFP) 100, a client computer 200, and a print management server 300 are connected to a network 400. While FIG. 1 shows an example in which only one of each of the apparatuses is connected to the network 400, the number of connected apparatuses is unrestricted.

The MFP 100 is equipped with a scanner unit that reads a document to generate image data of the document and a printer unit that forms an image on a recording paper, and functions as a printing apparatus having various functions such as those of a network printer and a copier. The client computer 200 executes various application programs in compliance with instructions from an operator and outputs print data to the network 400 in response to a print request from the operator. In addition, the client computer 200 also performs processing so as to assist in the monitoring and control of the MFP 100 and print jobs managed by the print management server 300. When printing with the MFP 100, applicable methods include directly transferring print data generated by the client computer 200 to the MFP 100 and transferring the print data to the MFP 100 via the print management server 300.

Figure 2:
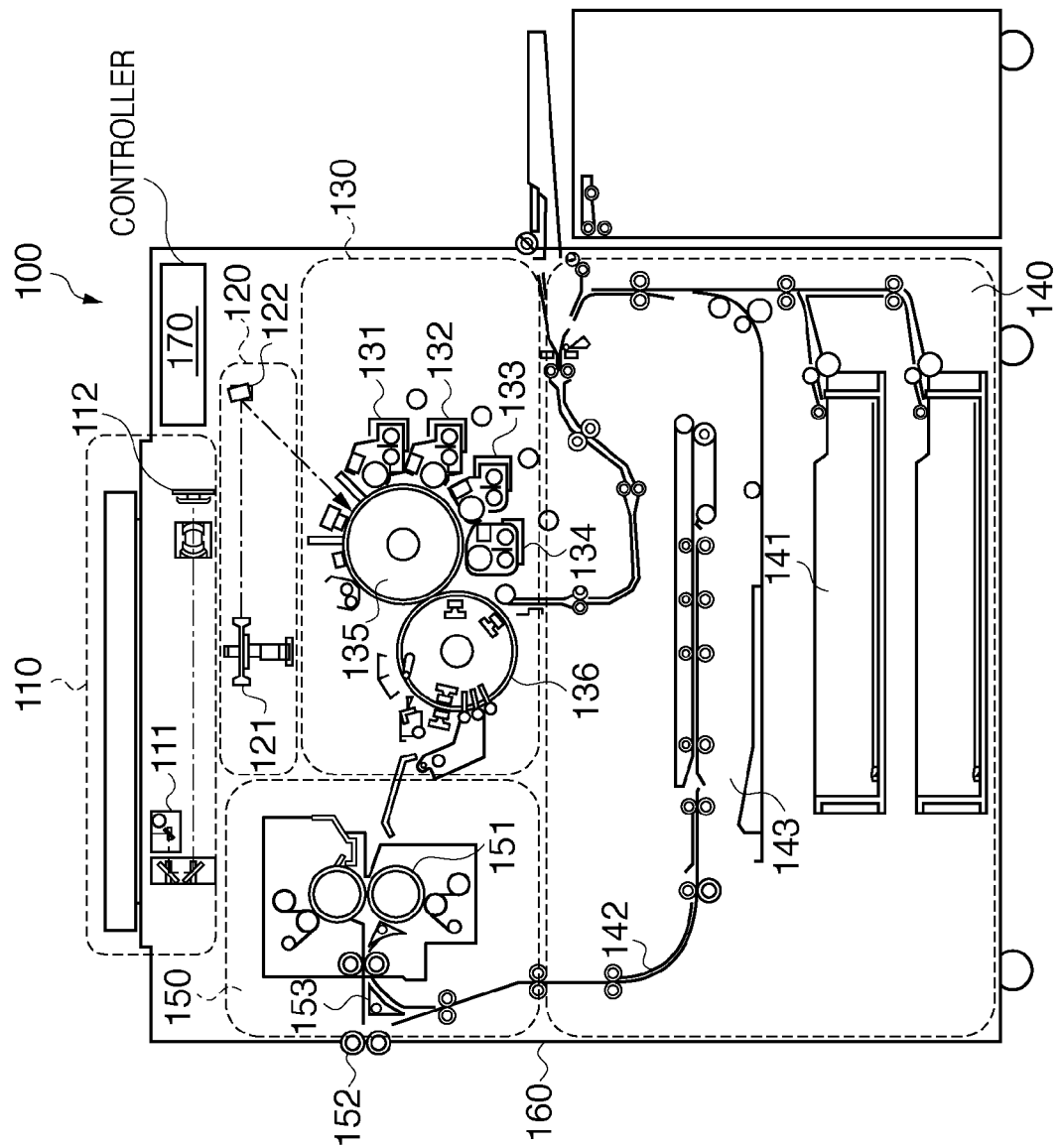
FIG. 2 depicts a view illustrating a cross-sectional structure of an MFP according to the present embodiment.

FIG. 2 depicts a view illustrating a cross-sectional structure of the MFP 100 according to the present embodiment.

The MFP 100 is provided with a scanner unit 110 that reads an image recorded on a face of a document, a printer unit 160 having respective units 120, 130, 140, and 150, and a controller 170.

The controller 170 is responsible for controlling the entire MFP 100 and is mounted as a printed circuit board including a microprocessor on the MFP. The controller 170 controls the scanner unit 110, performs network communication, and processing in accordance with the contents of various operations by an operator, and performs print processing described below.

The scanner unit 110 illuminates a document face, and is provided with an illumination unit 111 that scans and moves and a line CCD 112 that performs imaging on reflected light from the document face and converts the reflected light into an electric signal. The controller 170 A/D-converts signals successively outputted from the line CCD 112, and captures the A/D-converted signals as image data to perform various processing thereon.

In addition, in order to scan laser light from a laser element, not shown, which is driven by the controller 170, a laser exposure unit 120 of the printer unit 160 includes a polygonal mirror 121 rotated by a motor and a mirror 122 that reflects the laser light towards a photosensitive drum 135. An image forming unit 130 rotationally drives the photosensitive drum 135 and charges the surface of the photosensitive drum 135 with a charger. Due to the scanning of laser light by the laser exposure unit 120, the photosensitive drum 135 retains an electrostatic latent image on its surface. Developing units 131 to 134, having toners of the respective colors of magenta (M), cyan (C), yellow (Y), and black, transfer toner to the electrostatic latent image formed on the surface of the photosensitive drum 135 to form a toner image corresponding to the electrostatic latent image. The toner image formed in this manner on the photosensitive drum 135 is transferred to a recording paper (sheet). For this reason, a transfer drum 136 that rotates with the photosensitive drum 135 is provided. The transfer drum 136 wraps a sheet conveyed from a feed/conveyance unit 140 around itself using the action of static electricity. By performing, four times, a process in which a toner image of a single color component generated on the photosensitive drum 135 is transferred onto the sheet wrapped around itself, the transfer drum 136 forms a color image having four color components on the sheet.

Upon finishing transfer of the toner image of the four color components onto the sheet as described above, the controller 170 separates the sheet from the transfer drum 136 and conveys the sheet to a fixing unit 150. The fixing unit 150 has a built-in fixing roller 151 heated by a heat source such as a halogen heater. The fixing roller 151 heats and fixes the toner transferred on the sheet conveyed from the image forming unit 130 onto the sheet by heat and pressure. A discharge roller 152 discharges the toner-fixed sheet to the outside (finisher).

The MFP 100 according to the present embodiment is also capable of performing double-sided printing. A sheet sensor (not shown) is provided on an upstream side (the side of the image forming unit 130) of the discharge roller 152. Therefore, during double-sided printing, when the sheet sensor detects a trailing edge of a sheet, the controller 170 rotationally moves a flapper 153 by a predetermined angle and inversely rotates the discharge roller 152 to turn the sheet upside down and conveys the sheet towards a double-sided feed path 142 inside the feed/conveyance unit 140. The feed/conveyance unit 140 includes a sheet stocker 143 for double-sided recording which holds single-side-printed sheets from the aforementioned double-sided feed path 142, as well as one or more sheet cassettes 141 as typified by a paper deck. In response to an instruction from the controller 170, the feed/conveyance unit 140 separates a sheet from a plurality of sheets held in the sheet cassette 141 and conveys the sheet to the image forming unit 130, and from the image forming unit 130 to the fixing unit 150.

Next, a configuration of the controller 170 of the MFP 100 according to the present embodiment will be described.

Figure 3:
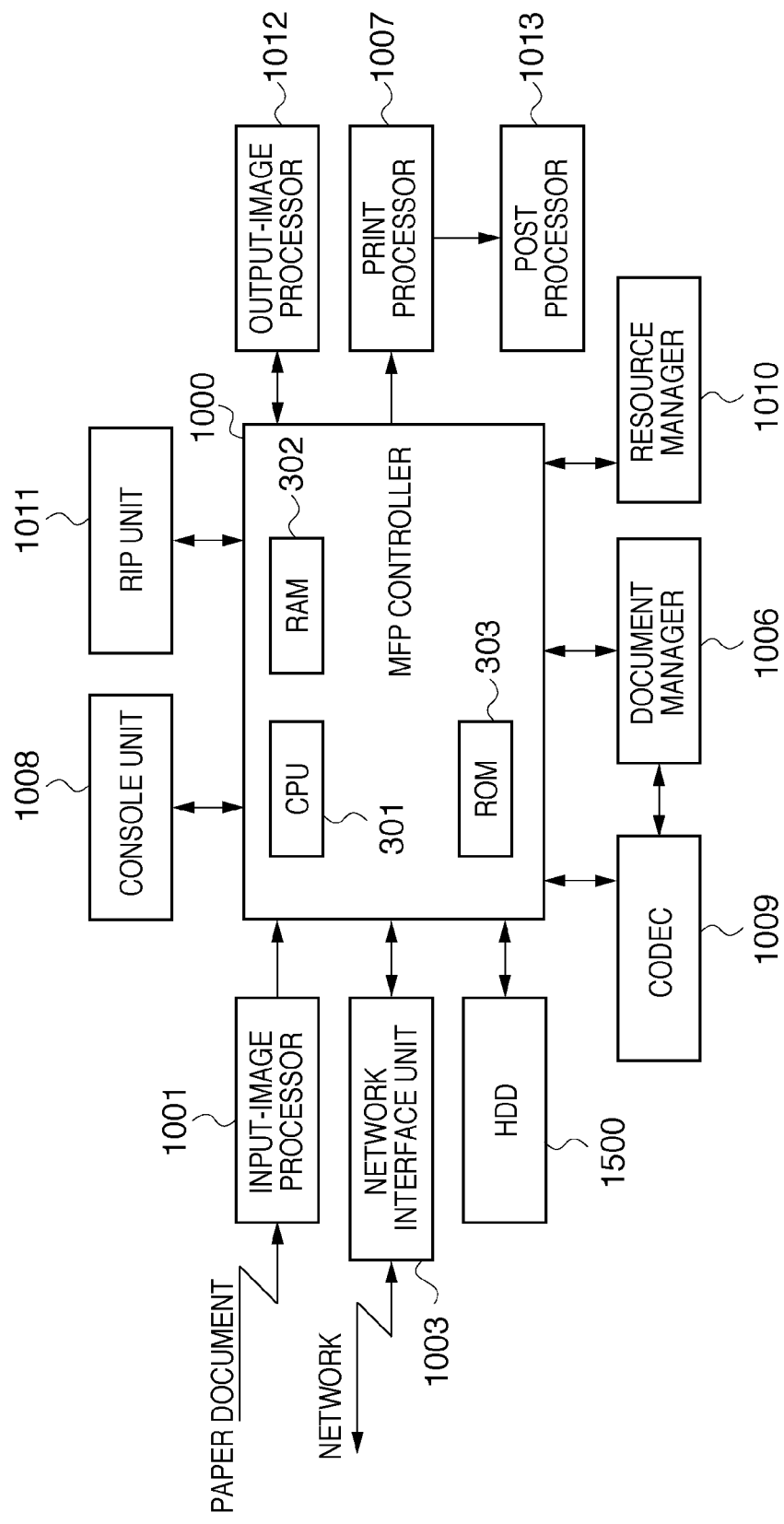
FIG. 3 is a block diagram showing a configuration of a controller of the MFP according to the present embodiment.

FIG. 3 is a block diagram showing a configuration of the controller 170 of the MFP 100 according to the present embodiment.

The controller 170 of the MFP 100 includes an MFP controller 1000 that is provided with: a CPU 301 that is a microprocessor or the like; a RAM 302 that stores a processing program and various data, and provides a work area; and a ROM 303 that stores a boot program and various data. The MFP controller 1000 undertakes a role of a traffic regulator which, depending on the application of the MFP, temporarily saves image data, determines a data path among various processing units to be described later, and the like. A program to be loaded to the RAM 302 is installed in an HDD 1500, and when an instruction to execute the program (function) is issued, the program is loaded from the HDD 1500 to the RAM 302 to be executed.

The controller 170 is provided with a hard disk (hereinafter HDD) 1500 that is a large capacity storage device capable of storing data of a plurality of print jobs. However, as long as the capacity is large and random access is enabled, the storage device need not be limited to an HDD and any storage device shall suffice. The MFP controller 1000 utilizes the HDD 1500 as a buffer. The MFP controller 1000 realizes a plurality of functions including copy processing of image data outputted from the scanner unit 110, and print processing based on print data outputted from the client computer 200 or the print management server 300 on the network 400, and the like. The MFP 100 comes in two types: a full-color device and a black-and-white device. With the exception of color processing, internal data and the like, these devices share the same basic components. In addition, since a configuration of the full-color device is inclusive of a configuration of the black-and-white device, the full-color device will be primarily described herein and descriptions on the black-and-white device will be occasionally added as needed.

As shown in FIG. 3, a plurality of processing units are connected to the MFP controller 1000. An input-image processor 1001 reads an image on a paper document or the like and performs image processing on the read image data. A network interface unit 1003 transmits and receives print data and apparatus information via the network 400. A document manager 1006 performs processing under the control of the MFP controller 1000 for storing image data from the input-image processor 1001 and image data obtained by analyzing print data received via the network interface unit 1003 into the HDD 1500. The document manager 1006 also performs processing under the control of the MFP controller 1000 for reading image data stored in the HDD 1500. Following an instruction by an operator from a console unit 1008, the MFP controller 1000 determines an output destination of image data read from the HDD 1500. For example, if the MFP controller 1000 has set a print processor 1007 as the output destination, print processing is performed. The document manager 1006 compresses image data as required when storing the same into the HDD 1500 and, conversely, when reading compressed data stored in the HDD 1500, expands (decodes) the compressed data into the original image data. For this purpose, the controller 170 is provided with a codec 1009. In addition, when print data received via the network interface unit 1003 is compressed data such as JPEG, JBIG, ZIP, or the like, the MFP controller 1000 performs control so as to decompress (expand) such data by the codec 1009. A resource manager 1010 retains and manages, under the control of the MFP controller 1000, various parameter tables and the like commonly handled by fonts, color profiles, gamma tables, and the like so as to enable them to be read. In addition, in response to a request from the MFP controller 1000, the resource manager 1010 stores new parameter tables and corrects and modifies existing parameter tables.

Next, processing performed when the MFP controller 1000 receives print data via the network interface unit 1003 will be described.

When the MFP controller 1000 receives print data, raster image processing is performed by a RIP (raster image processor) unit 1011. In addition, on an image to be printed, the MFP controller 1000 performs image processing for printing as required with an output-image processor 1012. Furthermore, the MFP controller 1000 stores intermediate data of print data and print-ready data (bitmap data for printing or compressed data thereof) created during such image processing into the HDD 1500 via the document manager 1006 as required. The processing for storing to the HDD 1500 is asynchronous to the operation of the print processor 1007.

In addition, in concurrence with the print processing timing of the print processor 1007, the MFP controller 1000 performs processing for reading image data of respective pages stored in the HDD 1500 via the document manager 1006 and outputting the image data to the print processor 1007. When doing so, the MFP controller 1000 controls a post processor 1013 in accordance with the description of the print data. The post processor 1013 controls a finisher that performs sheet sorting processing and sheet finishing processing.

Furthermore, the console unit 1008 functions as a user interface for selecting various functions and issuing operation instructions. The console unit 1008 is also provided with a high-resolution display apparatus, various instruction buttons, and a touch panel so as to be capable of presenting various display menus to the operator and displaying a preview of image data managed by the document manager 1006. Even when performing copying, the operator is to issue a copy instruction by operating the console unit 1008.

Next, an example of an overview of processing by the MFP controller 1000 according to the present embodiment will be described. The processing is realized by the CPU 301, the RAM 302 and the ROM 303 storing firmware of the MFP controller 1000, and by the various processing units shown in FIG. 3.

Figure 4:
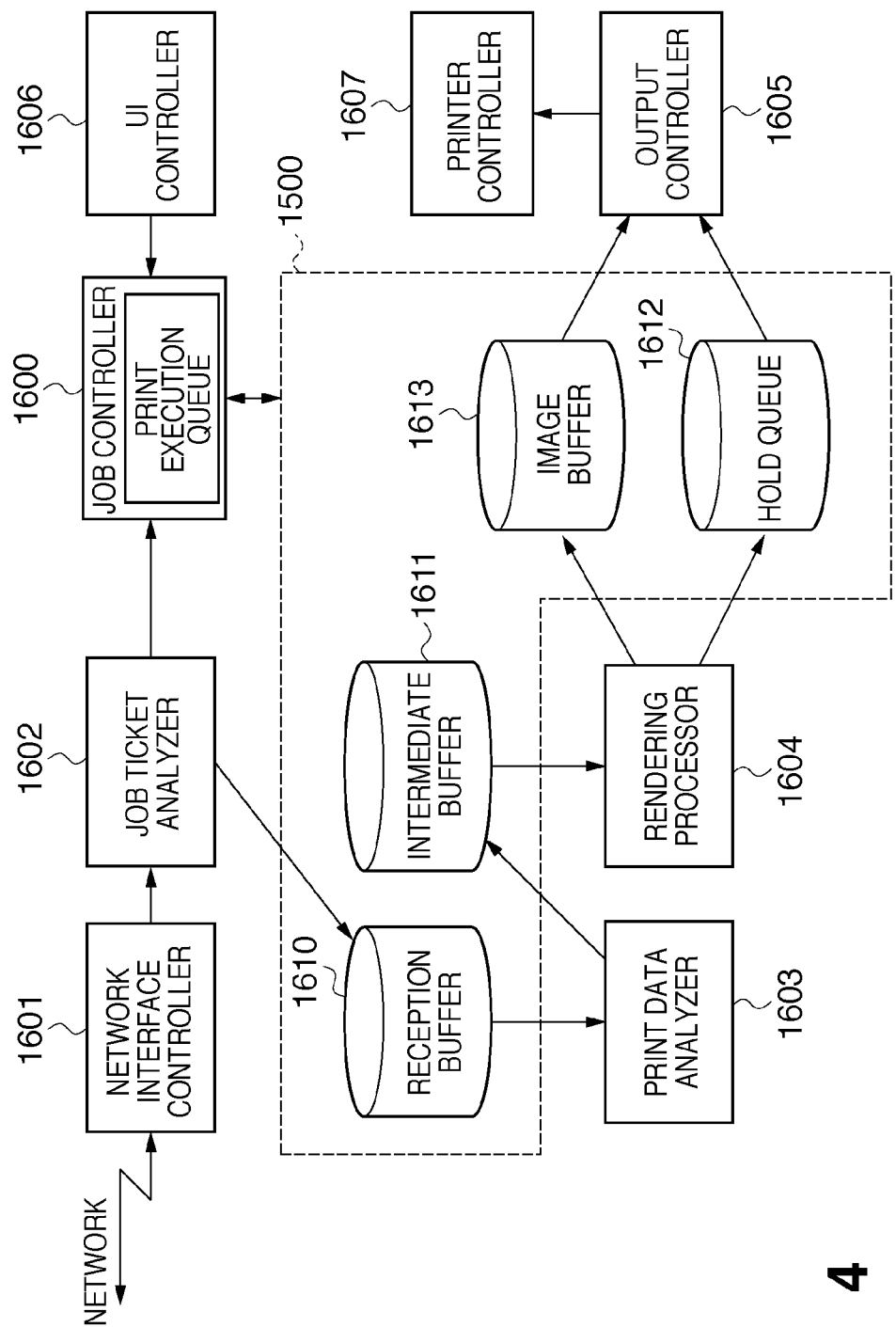
FIG. 4 is a diagram illustrating an example of an overview of processing by an MFP controller according to the present embodiment.

FIG. 4 is a diagram illustrating an example of an overview of processing by the MFP controller 1000 according to the present embodiment.

A network interface controller 1601 is responsible for controlling the network interface unit 1003 shown in FIG. 3. In addition, the network interface controller 1601 performs processing for analyzing a communication protocol, receiving print data from the client computer 200 or the print management server 300, and transmitting the received print data to a job ticket analyzer 1602. The job ticket analyzer 1602 analyzes a job ticket and relays an attribute of a print job to a job controller 1600, registers the print job into a management table (not shown) and stores the print data in a reception buffer 1610. Upon detecting that print data has been stored in the reception buffer 1610, a print data analyzer 1603 commences processing for analyzing the print data. That is, the print data analyzer 1603 reads print data stored in the reception buffer 1610, analyzes the print data and generates an object (intermediate code) corresponding to each command, and stores the object in an intermediate buffer 1611. While the present embodiment assumes commands supported by the printer unit 160 to be PDL (page description language), besides PDL data, a command may be of any type of data as long as per-page printing is enabled.

Upon detecting that data has been stored in the intermediate buffer 1611, a rendering processor 1604 commences processing for rendering. That is, the rendering processor 1604 reads intermediate data from the intermediate buffer 1611 on a per-page basis, and in the case of regular printing (when storage to a Hold queue 1612 has not been instructed), generates one page's worth of image data and stores the image data in an image buffer 1613.

Upon detecting that one page's worth of image data is stored in the image buffer 1613, an output controller 1605 performs processing for reading the image data and outputting the image data to a printer controller 1607 responsible for the control of the print processor 1007. In addition, in the case of a print job specifying storage to the Hold queue 1612, the rendering processor 1604 successively stores rendered image data of the respective pages in the Hold queue 1612. In this case, the output controller 1605 is not immediately activated, but performs printing of the job once a print instruction from the Hold queue 1612 is issued by a UI controller 1606. Here, Hold refers to a function in which data is not immediately printed but once stored as a print job in a storage device such as an HDD, and printing only commences when a print instruction is issued from an operator via the console unit 1008. The Hold function is used for test-printing a print job stored in the Hold queue 1612, and if no problems are found in the print result, for performing regular printing (plurality of copies) and the like. As a result, during regular printing, it is no longer necessary to re-transmit the print data from the client computer 200 or the print management server 300 to the MFP 100.

The UI controller 1606 is a unit that controls the user interface and performs processing for transferring display data to the console unit 1008 and notifying the MFP controller 1000 of input from the console unit 1008. In the present embodiment, a display unit provided at the console unit 1008 is a liquid crystal display. In addition, several keys are disposed at the console unit 1008, and a touch panel is provided in front of the liquid crystal display. The UI controller 1606 performs control such as displaying a character string, switching screens, and relaying a set value to another module in accordance with a user operation. The job controller 1600 manages jobs within the MFP 100 and controls job generation and extinction, job statuses, job processing orders, and the like. In particular, the job controller 1600 is internally provided with a print execution queue for determining whichever of image data of the image buffer 1613 or image data of the Hold queue 1612 is to be outputted to the output controller 1605. While the print execution queue may be stored in the HDD 1500, since the amount of information is small, it is hereby assumed that the print execution queue is stored in the RAM 302 of the MFP controller 1000. In the case of a regular print job, information (a job ID to be described later) identifying the job is to be automatically set in the print execution queue. In addition, in the case of a print job stored in the Hold queue 1612, the job ID is registered in the print execution queue only after the operator executes printing. Therefore, the job controller 1600 determines whichever of the image buffer 1613 and the Hold queue 1612 store the relevant image data based on a job ID registered in the print execution queue. Once the buffer storing the image data is identified, control is performed so as to output image data of the respective pages constituting the relevant print job to the output controller 1605.

Next, processing by the job controller 1600 that is one of the processing programs of the MFP controller 1000 will be described.

Figure 5:
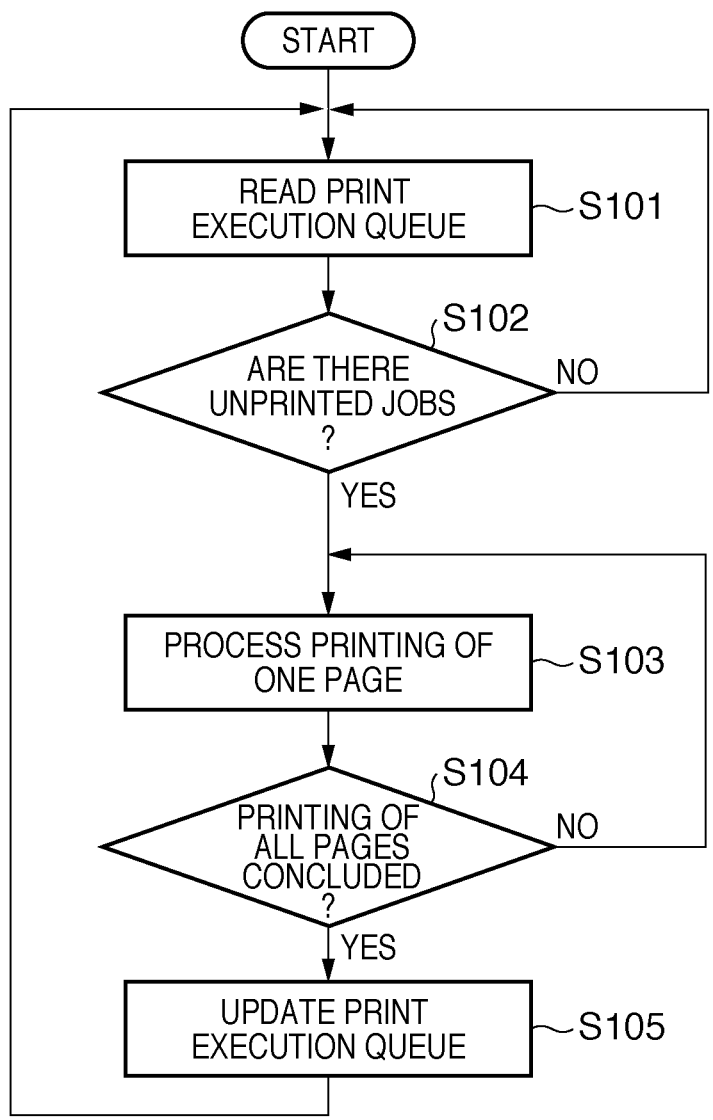
FIG. 5 is a flowchart describing processing by a job controller, which is one of the processing programs of the MFP controller according to the present embodiment.

FIG. 5 is a flowchart describing processing by the job controller 1600 that is one of the processing programs of the MFP controller 1000 according to the present embodiment. The processing shown in the flowchart is to be executed under the control of the CPU 301 in accordance with a program stored in the RAM 302 of the MFP controller 1000.

First, in step S101, the MFP controller 1000 reads the print execution queue. The process proceeds to step S102 to determine whether an unprinted job exists or not. If the MFP controller 1000 determines that there are no unprinted jobs, the process returns to the processing of step S101. On the other hand, if the MFP controller 1000 determines in step S102 that there is an unprinted job in the print execution queue, the process proceeds to step S103. In step S103, the MFP controller 1000 finds out whether relevant image data is in the image buffer 1613 or in the Hold queue 1612 from the job ID (to be described later) of the unprinted job, and reads one page's worth of image data to perform print processing. Next, the processing of S103 is repeated until it is determined in step S104 that printing of all pages has been completed. If the MFP controller 1000 determines in step S104 that print processing for all pages has been completed, the process proceeds to step S105. In step S105, the MFP controller 1000 deletes the ID of the print job for which printing has been completed from the print execution queue and deletes the print job on which processing has been completed from the HDD 1500. Moreover, as will be described later, in the case of test printing, the MFP controller 1000 deletes the job ID from the print execution queue but not the actual print job.

Meanwhile, various applications and a printer driver for using the MFP 100 according to the present embodiment are installed in the client computer 200.

Figure 6:
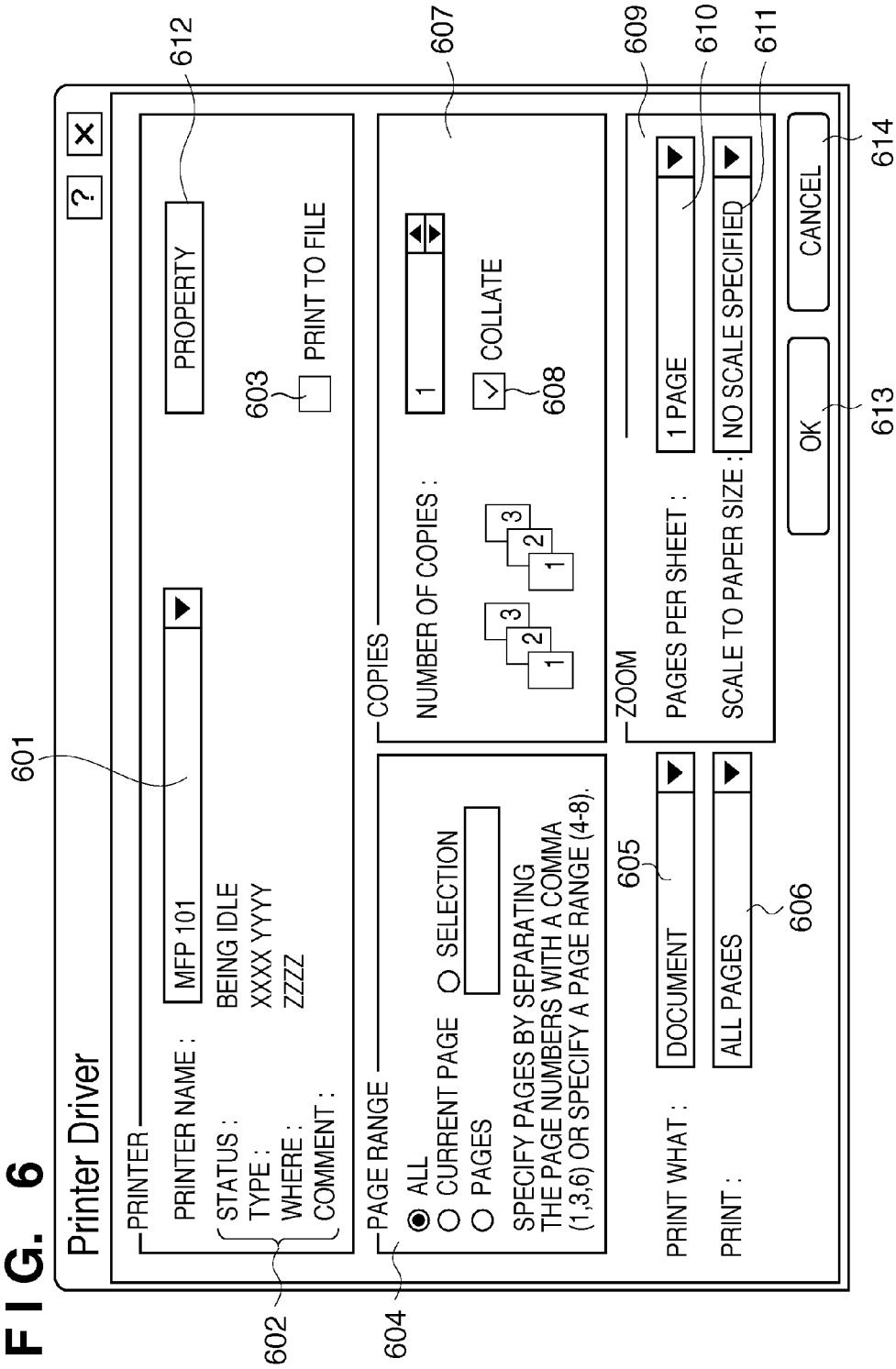
FIG. 6 depicts a view illustrating an example of a print setting screen of a printer driver of a client computer according to the present embodiment.

FIG. 6 depicts a view illustrating an example of a print setting screen of a printer driver of the client computer 200 according to the present embodiment. The printer driver displays this screen when the user selects a print menu of a running application.

"Printer name" 601 in the setting screen is arranged as a pull-down list box. At this point, when the user selects an MFP to be used, as represented by reference numeral 602, a status of the MFP is displayed in "status" therebelow, a type of the printer driver in "type", information on where the MFP is placed in "where", and comment information from a manager of the MFP in "comment". These items of information are obtained by issuing a data request message to a relevant MFP when the print setting screen is displayed or when an MFP to be used is selected. Moreover, when it is desirable to output print data to a file without printing the print data with the MFP, a "print to file" check box 603 is checked. By doing so, print data generated by the printer driver can be stored as a file in a storage device provided in the client computer 200.

"Page range" 604 is provided with radio buttons "all", "current page", "selection", and "pages" as items for selecting which pages are to be printed. The user is to select one of these items ("all" is the default setting). If the user selects "pages" using a pointing device, an edit box transitions to an input-enabled state where the user is to input the number of one or more pages to be printed using a keyboard.

Furthermore, a "print what" pull-down list box 605 enables selection of an attribute of a document to become a print object. A "print" pull-down list box 606 enables specification of whether all the pages are to be printed or just odd number or even number pages are to be printed.

"Copies" 607 enables setting the number of copies to be printed. The user is to input the number of copies to be printed in a "number of copies" spin box. In addition, when printing a plurality of copies per set as opposed to printing per page, a "collate" check box 608 is made selectable.

"Zoom" 609 enables specification of N-up printing (printing in which a plurality of pages can be laid out on a single printing sheet) through a "pages per sheet" pull-down list box 610. A "scale to paper size" pull-down list box 611 is for selecting a paper size of a paper (sheet) with respect to the size of a document. In addition, a "property" button 612 is for further setting more detailed print attributes.

Once the user completes setting of the printer driver setting screen, by specifying an "OK" button 613, print data may either be transferred to the MFP 100 to be printed or outputted to a file. In addition, when canceling printing or file output, specifying a "cancel" button 614 shall suffice.

Figure 7:
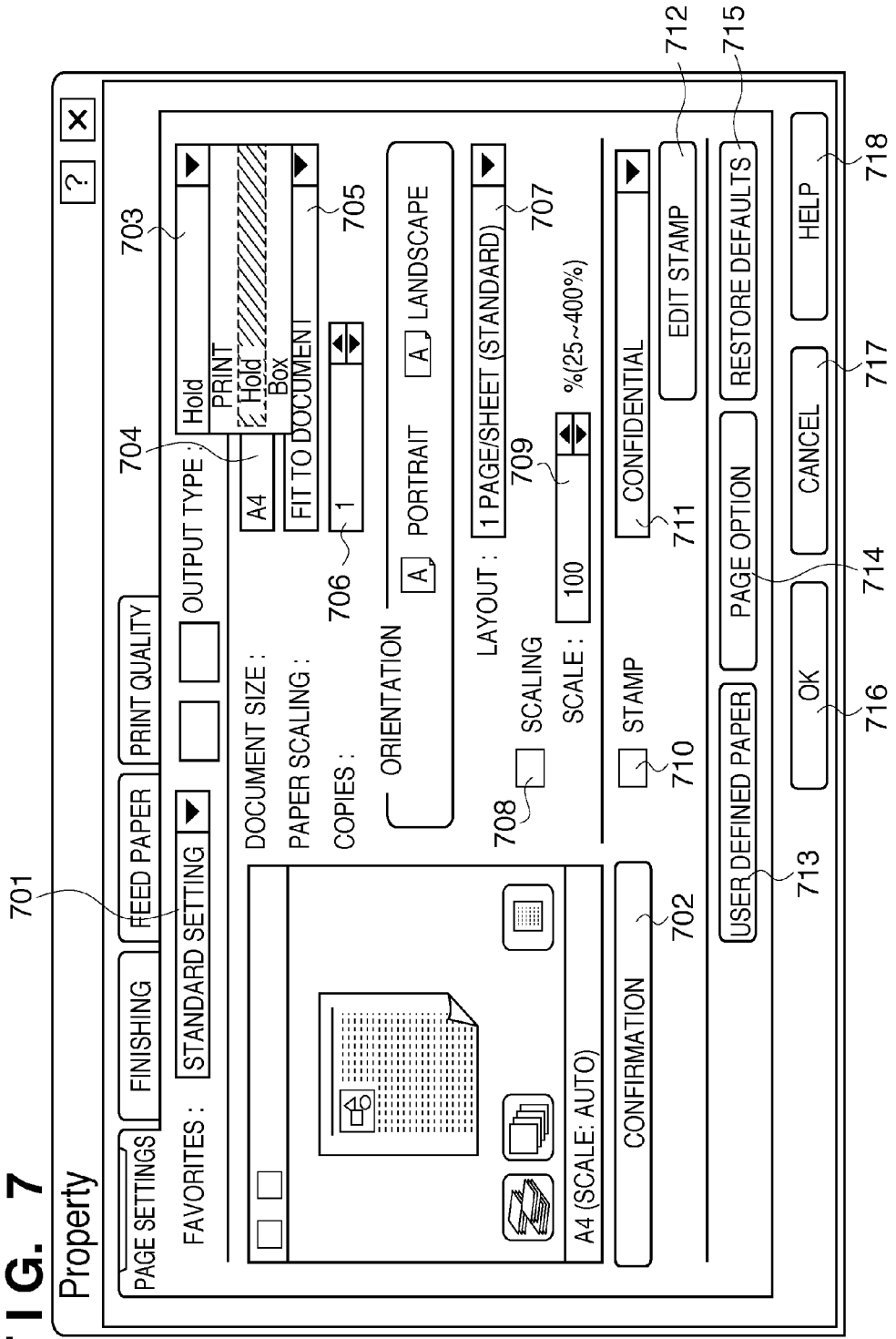
FIG. 7 depicts a view illustrating an example of a setting screen displayed when a user specifies a "property" button on the screen shown in FIG. 6 with a pointing device.

FIG. 7 depicts a view illustrating an example of a setting screen displayed when the user specifies the "property" button 612 on the screen shown in FIG. 6 with a pointing device. Moreover, the setting screen is provided with a plurality of tabs. Initially, a state is shown in which a "page settings" tab has been selected.

A "favorites" pull-down list box 701 is for selecting an optimal page setting from predetermined page setting modes. In addition, when the printer driver detects that a "confirmation" button 702 has been specified, a print image of the top page is displayed in a page image area displayed above the "confirmation" button 702 in accordance with contents set by the property setting screen.

With an "output type" pull-down list box 703, an output method is specified such as having the MFP 100 perform regular printing or storing in the Hold queue 1612 of the MFP 100. In the diagram, "Hold" representing storing in the Hold queue 1612 is specified by a cursor. When storing in the Hold queue 1612 is specified in this manner, the printer driver generates and outputs print data including a job ticket signifying storing in the Hold queue 1612. Upon reception thereof, the MFP controller 1000 performs processing for generating image data and subsequently performs processing up to storing the respective pages in the Hold queue 1612. In other words, print processing is not performed. Print processing is commenced when the MFP controller 1000 determines that a print instruction has been inputted via the console unit 1008.

A "document size" pull-down list box 704 and a "paper scaling" pull-down list box 705 are for selecting a size of a document to become a print object and a paper size of a sheet. A "copies" spin box 706 is for inputting the number of copies to be printed, and an "orientation" radio button is for selecting a sheet orientation such as "portrait", "landscape", and the like. A "layout" pull-down list box 707 is for specifying N-up printing (printing in which a plurality of pages are laid out on a single printing face). When a "scaling" check box 708 is checked, a scale of enlargement/reduction can be designated in % units in a "scale" spin box 709. When a "stamp" check box 710 is checked, predetermined stamp types become selectable at a pull-down list box 711. Specifying an "edit stamp" button 712 enables a stamp type to be added or edited. A "user defined paper" button 713 enables the user to define a sheet. A "page option" button 714 enables the user to set more detailed page options. In addition, a "restore default" button 715 restores various setting contents to default setting contents.

Once the user completes setting of the printer driver property setting screen, the user designates an "OK" button 716. When it is detected that the "OK" button 716 has been designated, the printer driver reflects the print attributes set on the setting screen to actual printing. A "cancel" button 717 is to be pressed when canceling setting of the property setting screen. A "help" button 718 is for displaying a help screen of the property setting screen.

At this point, a CPU (not shown) of the client computer 200 detects that the "OK" button 613 shown in FIG. 6 has been designated by the user. Consequently, in accordance with a printer driver program, data handed over by an application is received and generation processing of print data constituted by a job ticket and PDL data is performed. Subsequently, an OS of the client computer 200 transfers the print data as a print job to the MFP 100 according to the present embodiment.

Figure 8:
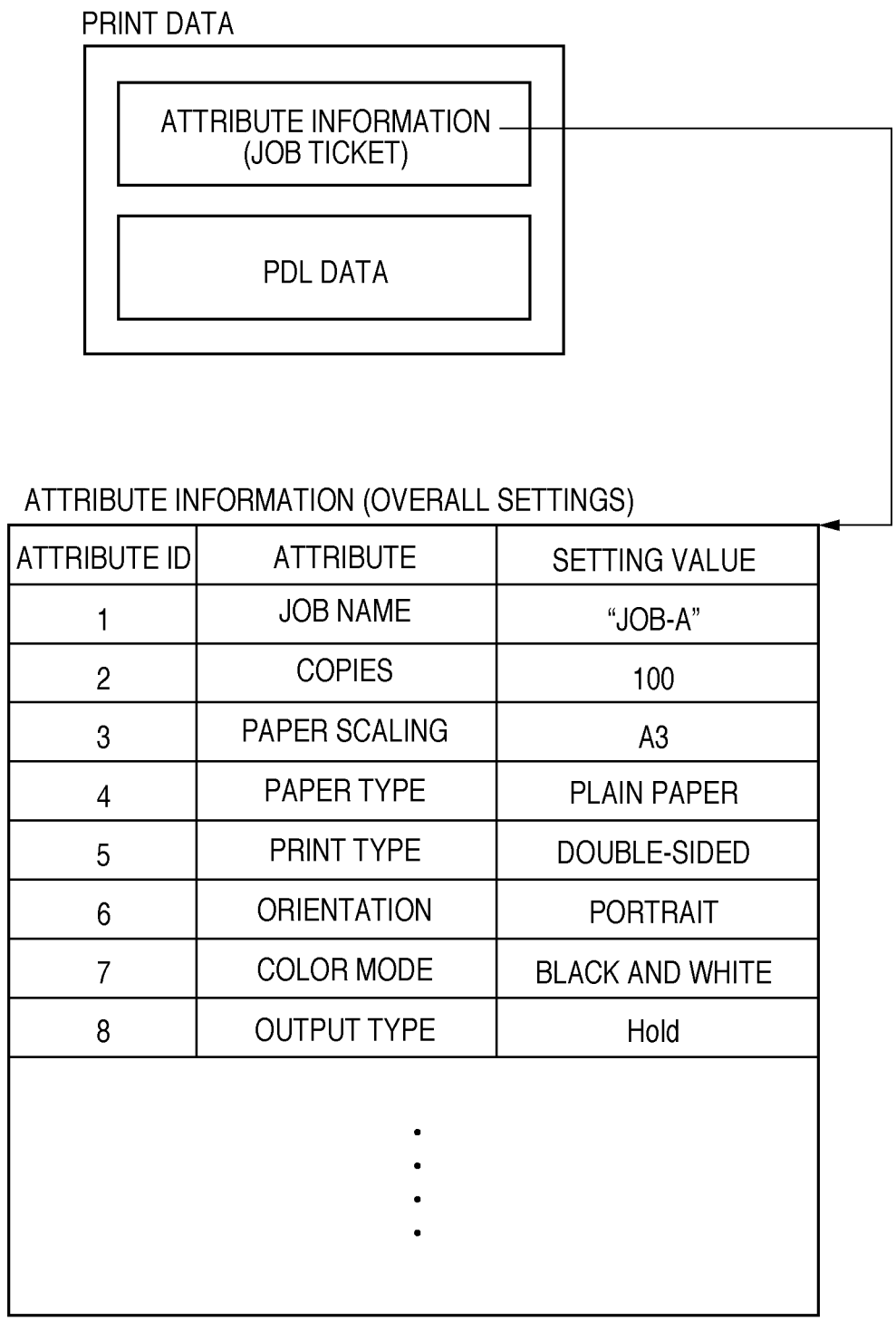
FIG. 8 is a diagram describing a structure of print data transferred to the MFP according to the present embodiment.

FIG. 8 is a diagram describing a structure of print data transferred to the MFP 100 according to the present embodiment. In this case, the print data includes attribute information (job ticket) and PDL data.

In the example shown in FIG. 8, stored in attribute information (overall setting) are attribute IDs and respective setting values of "job name", "number of copies", "paper size", "paper type", "print type", "orientation", "color mode", "output type", and the like. In addition, it is assumed that attribute information is described in XML format or the like. Set in each attribute are setting values in accordance with settings made on the printer driver setting screen shown in FIG. 6 and on the property setting screen shown in FIG. 7. In addition, as shown in FIG. 7, it is assumed that "Hold" has been specified as the output type.

Next, a display example on the console unit 1008 of the MFP 100 according to the present embodiment will be described.

Figure 9:
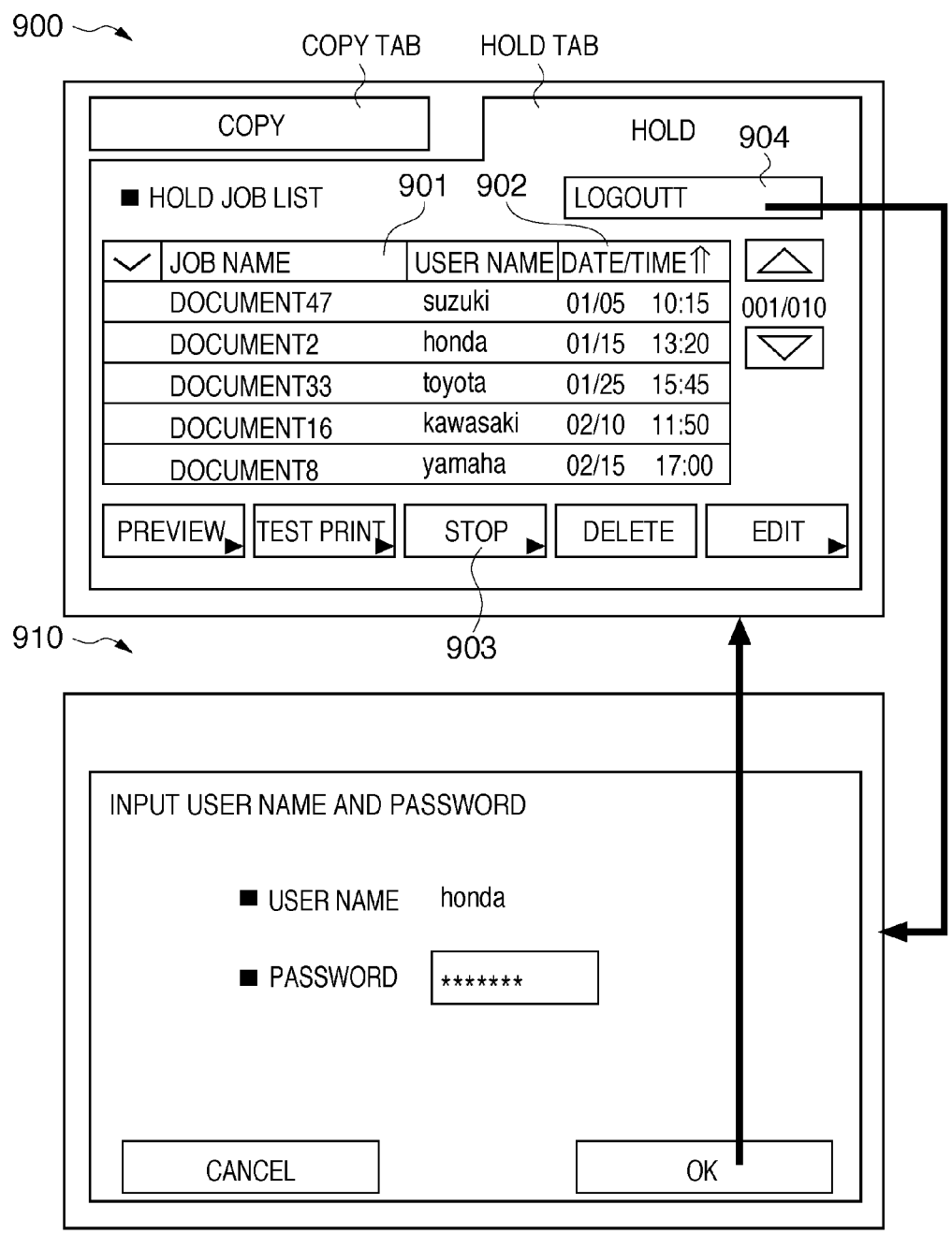
FIG. 9 depicts a view illustrating an example of a screen displayed on a display unit of a console unit of the MFP according to the present embodiment.

FIG. 9 depicts a view illustrating an example of a screen displayed on a display unit of the console unit 1008 of the MFP 100 according to the present embodiment. A touch panel is used as the display unit of the console unit 1008 of the MFP 100 according to the present embodiment. In addition, various tabs are provided for different functions. In the present embodiment, "copy" and "hold" tabs are provided.

Reference numeral 900 denotes a state where the "hold" tab among the two tabs is active. The display screen is referred to as a main screen of the hold tab (hold job list screen). In the hold job list screen, job information of the respective print jobs stored in the Hold queue 1612 in the HDD 1500 is displayed in a list format. Only one Hold queue 1612 exists in the MFP 100 and is used for the purpose of temporarily storing print jobs. In addition, in FIG. 9, a job name, a user name, and a date/time (the date and time at which a print job was stored) are displayed as job information of a print job stored in the Hold queue 1612. Furthermore, job information of the respective print jobs stored in the Hold queue 1612 is displayed in an ascending order of date/time (a chronological order of date/time).

On the hold job list screen, an operator touches a "job name" button 901 or a "date/time" button 902 among the job list items. Consequently, job information of the respective print jobs stored in the Hold queue 1612 can be sorted and displayed according to name or date/time. When the MFP controller 1000 detects that the "job name" button 901 or the "date/time" button 902 has been touched, the MFP controller 1000 sorts the job information of the respective print jobs stored in the Hold queue 1612. In other words, the job information is sorted in the order of "job name" or "date/time" as specified. Subsequently, processing is performed for reflecting the sorting result onto the display screen of the console unit 1008. Touching a line of lines in which the respective jobs are displayed on the screen shown in FIG. 9 enables selection of a print job that is a print object. In addition, a plurality of print jobs can be selected. When a plurality of print jobs are selected, since numbers (not shown) are to be displayed to the left of the job names of the print jobs, a selection order can be discerned by the numbers. When selecting a plurality of print jobs and issuing a print instruction, after jobs to be printed are set to a selected state, a "print" button 903 is touched. As a result, print processing is commenced according to the selected order.

In addition, by selecting a print job and touching a button at the bottom of the screen, the operator is able to perform operations on a relevant job. Buttons for specifying such an operation include "preview", "test print", "print", "delete", and "edit". "Preview" displays a preview of a selected print job. "Test print" displays a test print setting of a selected print job. "Print" performs formal printing of a selected print job. "Delete" deletes a selected print job from a hold job list screen (the actual print job is retained). "Edit" enables changes to be made to the print settings of a selected print job.

A user name and a password can be set when using the MFP 100. Reference numeral 910 denotes an example of a login screen displayed upon activation of the MFP 100 when a user name and a password has been set for the MFP 100. When a user name and a correct password are inputted on the login screen 910, the login screen transitions to a "copy tab" main screen or a "hold tab" main screen. Note that it is similarly assumed that a touch keyboard is to be displayed on the display screen of the console unit 1008 and a user name and a password are to be inputted using the touch keyboard.

When a user name and a password have been set for the MFP 100, a "logout" button 904 is displayed. When the MFP controller 1000 detects that the "logout" button 904 has been touched, the login screen 910 is displayed. Inputting a user name and a corresponding password results in successful authentication, whereby the screen returns to the hold job list screen denoted by reference numeral 900 to enable user operations.

Figure 10A:
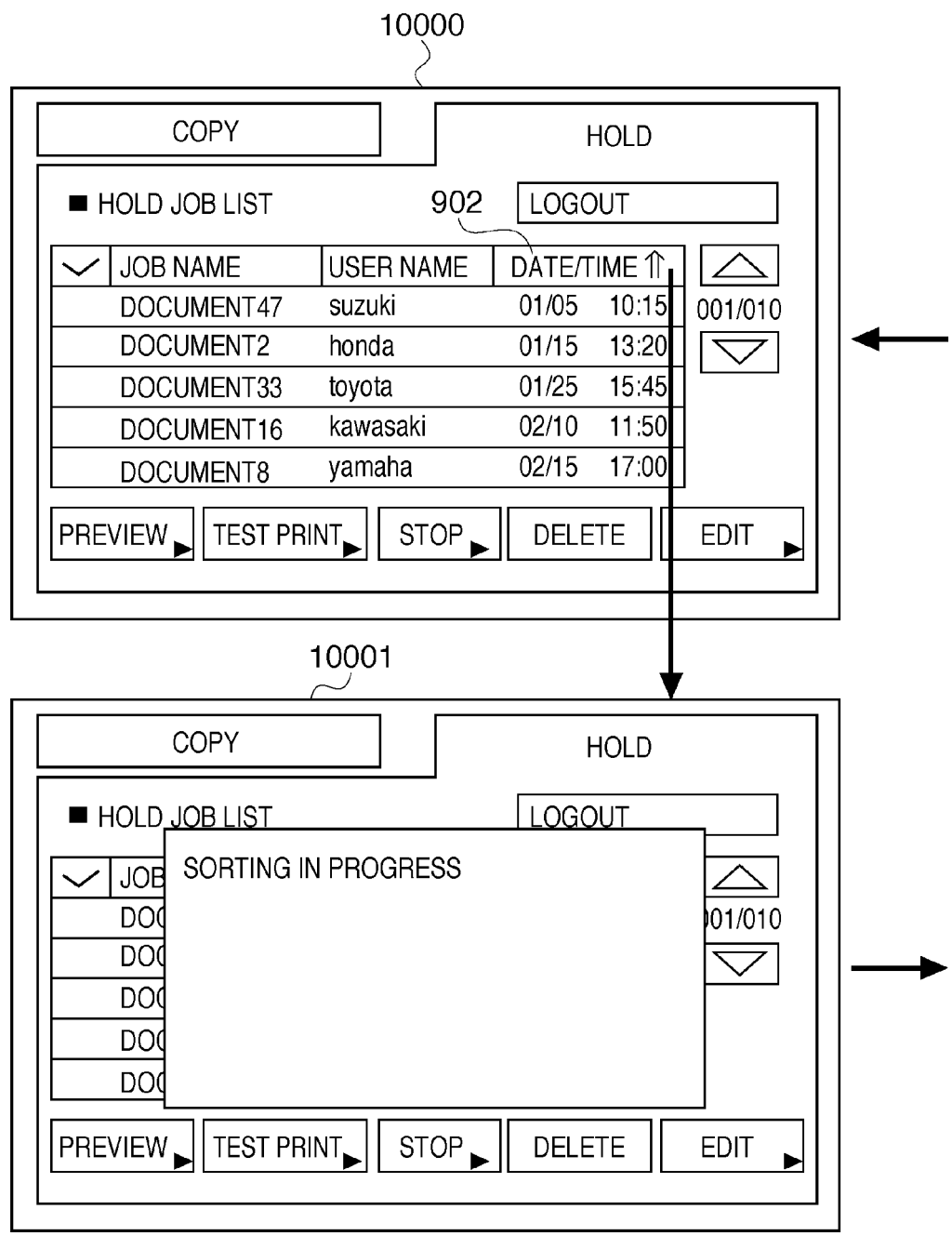
FIGS. 10A and 10B are diagrams showing an example of screen transitions of a hold tab displayed when an operator repeatedly touches a "date/time" button on the display unit of the console unit of the MFP according to the present embodiment.
Figure 10B:
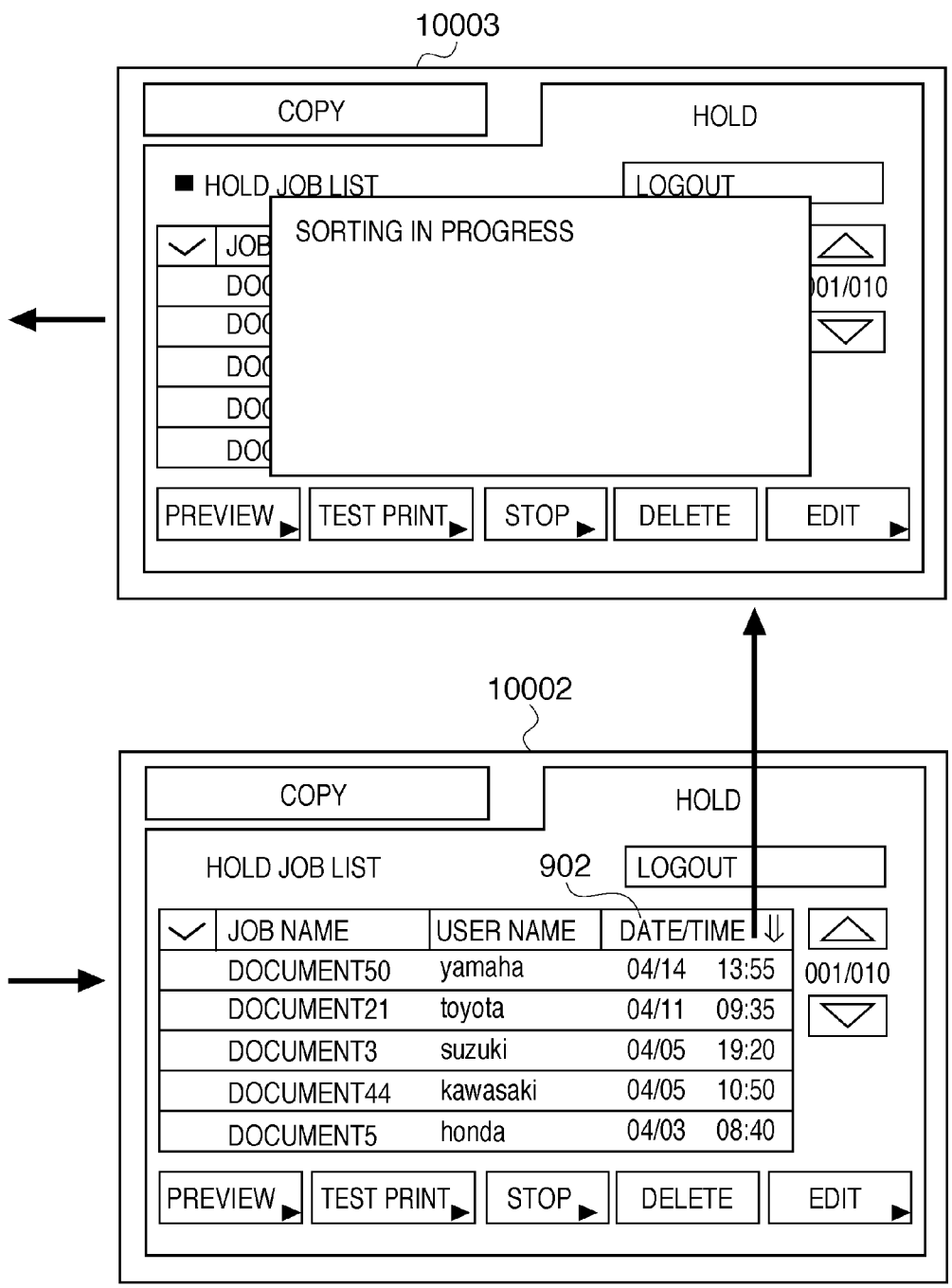

FIGS. 10A and 10B are diagrams showing an example of transitions of a hold tab screen displayed when the operator repeatedly touches (operation for item specification) the "date/time" button 902 on the display unit of the console unit 1008 of the MFP 100 according to the present embodiment.

In FIG. 10A, reference numeral 10000 corresponds to the hold job list screen denoted by reference numeral 900 in FIG. 9. Job information of the respective print jobs stored in the Hold queue 1612 is displayed in an ascending order of date/time. At this point, if the MFP controller 1000 detects that the "date/time" button 902 has been touched, then the MFP controller 1000 displays a popup dialog and displays a message (sorting in progress) to the effect that job information of the respective print jobs is currently being sorted, as indicated by reference numeral 10001. The MFP controller 1000 waits for the sort processing of the job information of the respective print jobs to conclude. When the sort processing is concluded in this manner, the MFP controller 1000 displays a hold job list screen as denoted by reference numeral 10002 (FIG. 10B). Here, job information of the respective print jobs stored in the Hold queue 1612 is displayed in a descending order of date/time (a reverse chronological order of date/time). Furthermore, in this state, if the MFP controller 1000 detects that the "date/time" button 902 has been touched, then the MFP controller 1000 displays a popup dialog indicating that sorting is in progress and waits for the sort processing of the job information of the respective print jobs to conclude, as represented by reference numeral 10003 (FIG. 10B). When the sort processing is concluded, the MFP controller 1000 displays the hold job list screen denoted by reference numeral 10000. In the hold tab screen 10000, job information of the respective print jobs stored in the Hold queue 1612 are displayed in an ascending order of date/time (a chronological order of date/time).

Figure 11A:
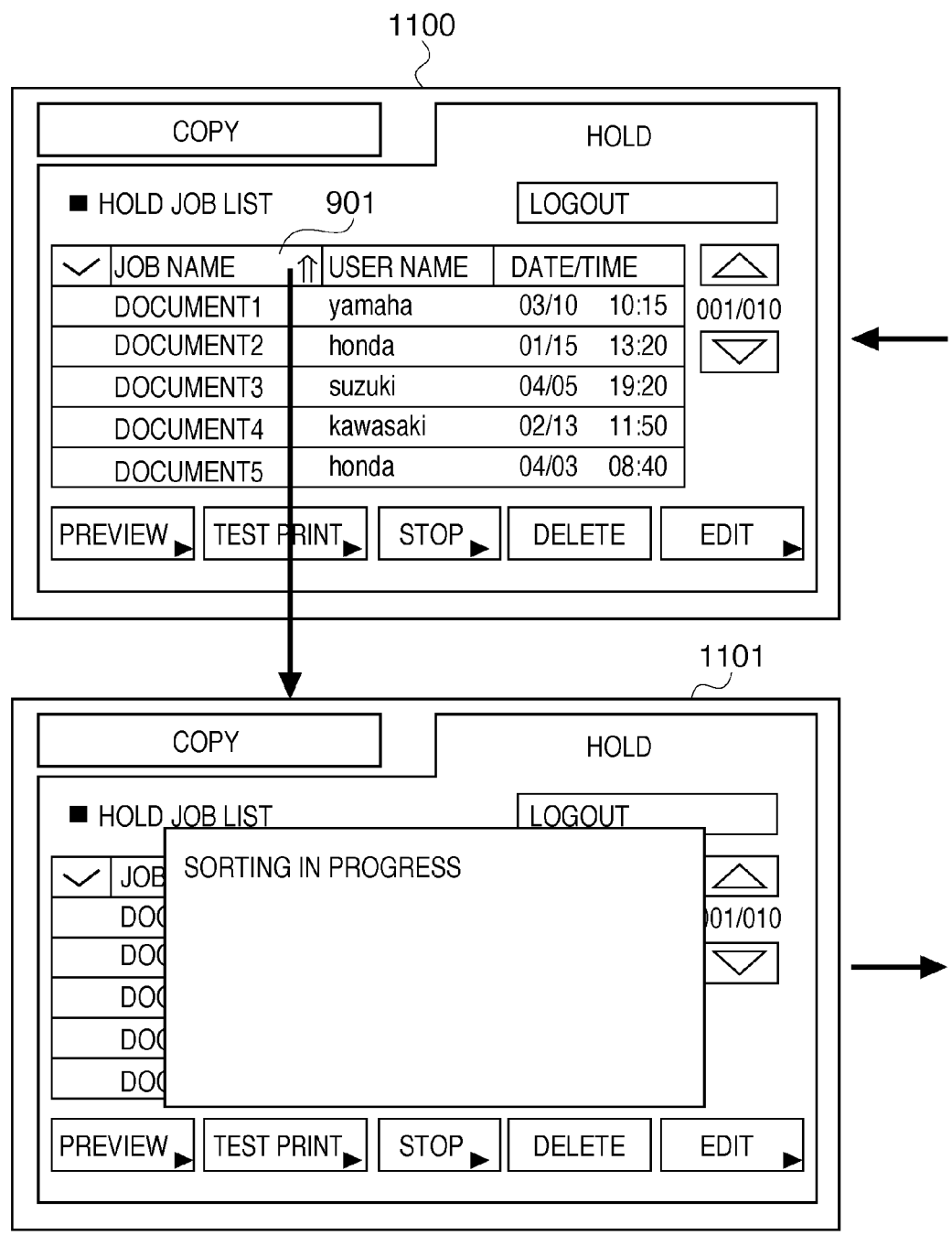
FIGS. 11A and 11B are diagrams showing an example of screen transitions of a hold tab displayed when an operator repeatedly touches a "job name" button on the display unit of the console unit of the MFP according to the present embodiment.
Figure 11B:
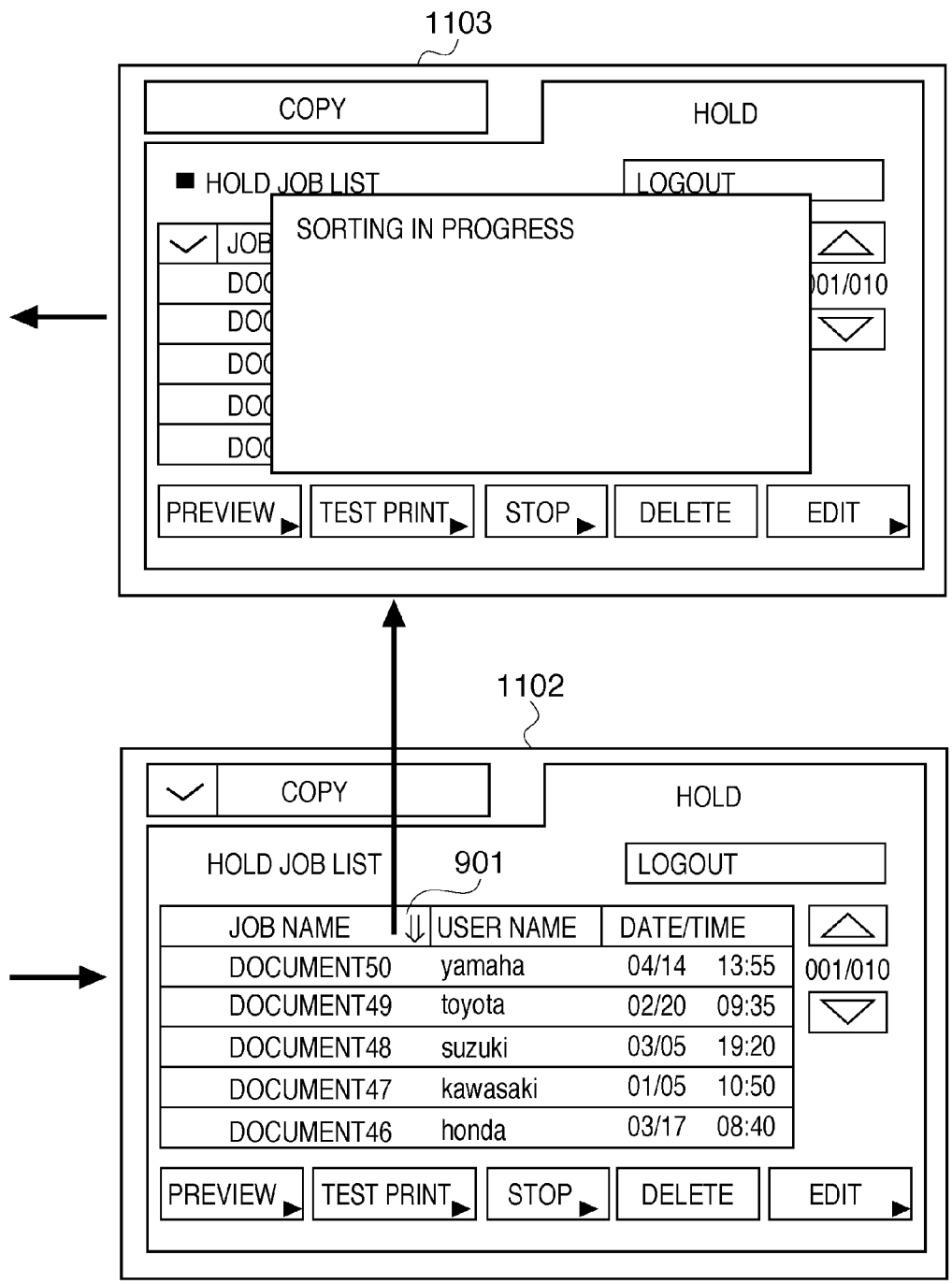

FIGS. 11A and 11B are diagrams showing an example of transitions of a hold tab screen displayed when the operator repeatedly touches the "job name" button 901 on the display unit of the console unit 1008 of the MFP 100 according to the present embodiment.

Reference numeral 1100 denotes a case in which job information of the respective print jobs stored in the Hold queue 1612 are displayed in an ascending order of job names. In this case, a list of print jobs in an order (ascending order) of job names is displayed. In this state, if the MFP controller 1000 detects that the "job name" button 901 has been touched, then the MFP controller 1000 displays a popup dialog indicating that sorting is in progress and waits for the sort processing of the job information of the respective print jobs to conclude, as represented by reference numeral 1101. When the sort processing is concluded, the MFP controller 1000 displays a hold job list screen as denoted by reference numeral 1102 (FIG. 11B). In the hold job list screen 1102, job information of the respective print jobs stored in the Hold queue 1612 are displayed in a descending order of job names. Furthermore, in the state represented by reference numeral 1102, if the MFP controller 1000 detects that the "job name" button 901 has been touched, then the MFP controller 1000 displays a popup dialog indicating that sorting is in progress and waits for the sort processing of the job information of the respective print jobs to conclude, as denoted by reference numeral 1103 (FIG. 11B). When the sort processing is concluded in this manner, the MFP controller 1000 displays a hold job list screen as denoted by reference numeral 1100 in which job information is displayed in an ascending order of job names. In this example, a case is shown in which 50 print jobs (documents) are stored in the Hold queue 1612.

In the present embodiment, an array order of job names or date/time is switched back and forth between an ascending order and a descending order in response to a change request made using the "job name" button 901 or the "date/time" button 902. However, the present invention is not limited to this arrangement and job names or date/time may always be displayed in an ascending order or a descending order.

Figure 12:
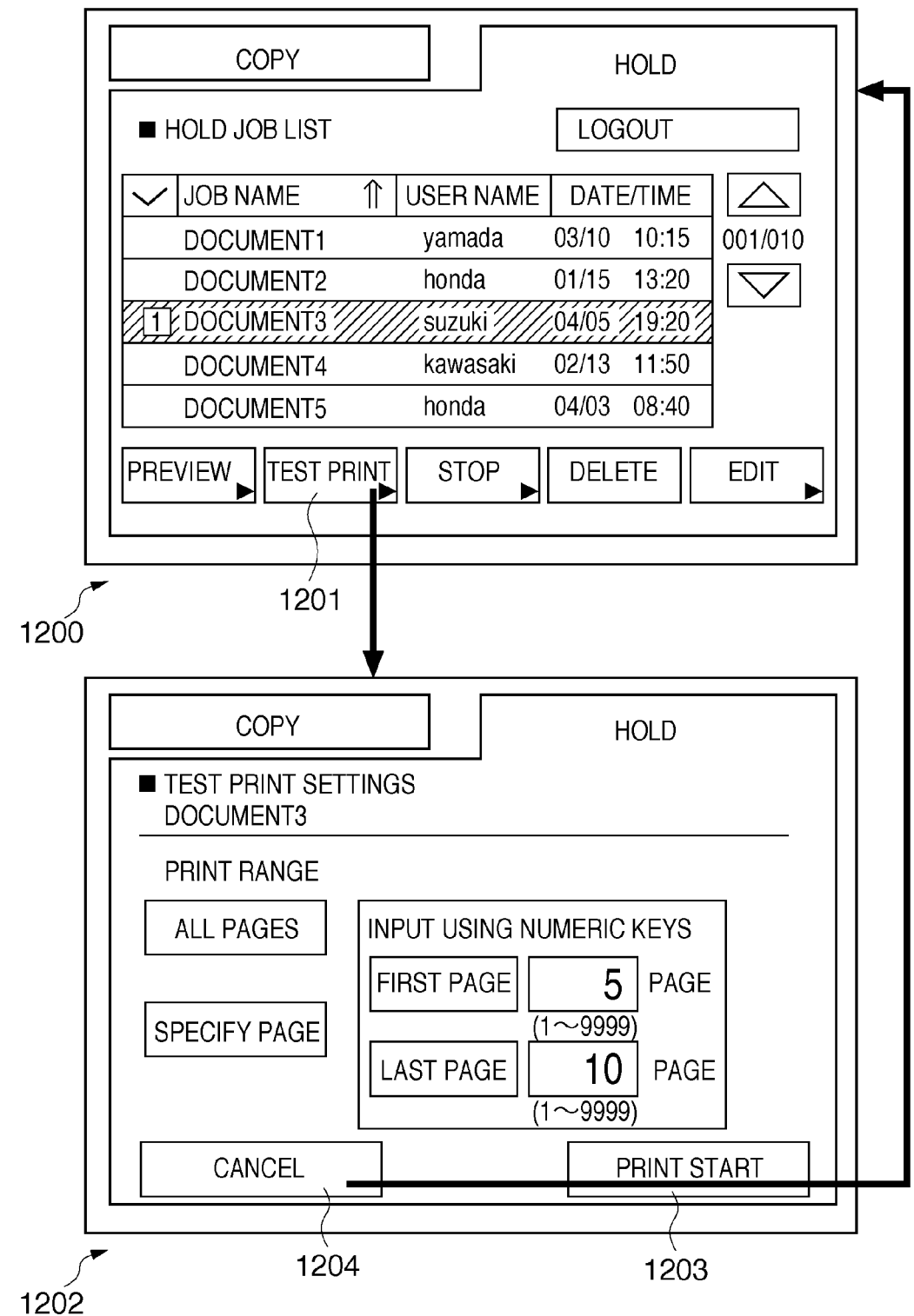
FIG. 12 depicts a view illustrating an example of a screen displayed on the display unit of the console unit of the MFP according to the present embodiment.

FIG. 12 depicts a view illustrating an example of a screen displayed on the display unit of the console unit 1008 of the MFP 100 according to the present embodiment. In this case, an example of a hold job list screen displayed when an operator touches the hold tab is shown. Here, as represented by reference numeral 1100 of FIG. 11A described earlier, a hold job list screen is displayed in which job information is displayed in an ascending order of job names.

Reference numeral 1200 denotes a state in which job information of the respective print jobs stored in the Hold queue 1612 is displayed in an ascending order of job names and a job corresponding to a job name "document 3" has been selected. In this state, if the MFP controller 1000 detects that a "test print" button 1201 has been touched, the screen shown as shown by numeral 1202 is displayed. This screen 1202 is a display example in a case where the test print has been set for the print job of "document 3". A number indicating an order (in this case, "1") of the aforementioned document is displayed to the left of "document 3". Moreover, the screen 1202 is provided with the respective buttons of "all pages", "specified pages", "first page", "last page", "cancel", and "print start".

When test-printing all pages of a print job, the operator must touch the "all pages" button. On the other hand, when test-printing only a part of the pages of a print job, the operator must touch the "specified pages" button. If the "specified pages" button has been touched, when the operator touches the "first page" button, a first page of the test print can be inputted using numeric keys provided on the console unit 1008. In addition, when the operator touches the "last page" button, a last page of the test print can be inputted using numeric keys provided on the console unit 1008. In the example shown in FIG. 12, a test print of five pages of page 5 to page 10 is specified in which the first page is page 5 and the last page is page 10.

In this state, when the operator touches a "print start" button 1203, test print of the print job commences. In other words, when the MFP controller 1000 detects that the "print start" button 1203 has been touched, the MFP controller 1000 performs processing for registering the print job in the print execution queue. In addition, if the operator touches a "cancel" button 1204, the screen 1200 is restored. At this point, on the hold job list screen 1200, job information of the print jobs stored in the Hold queue 1612 is redisplayed in the display format prior to the transition to the test print setting screen or, in other words, in a state where a display format for displaying the job names in an ascending order is retained.

Figure 13:
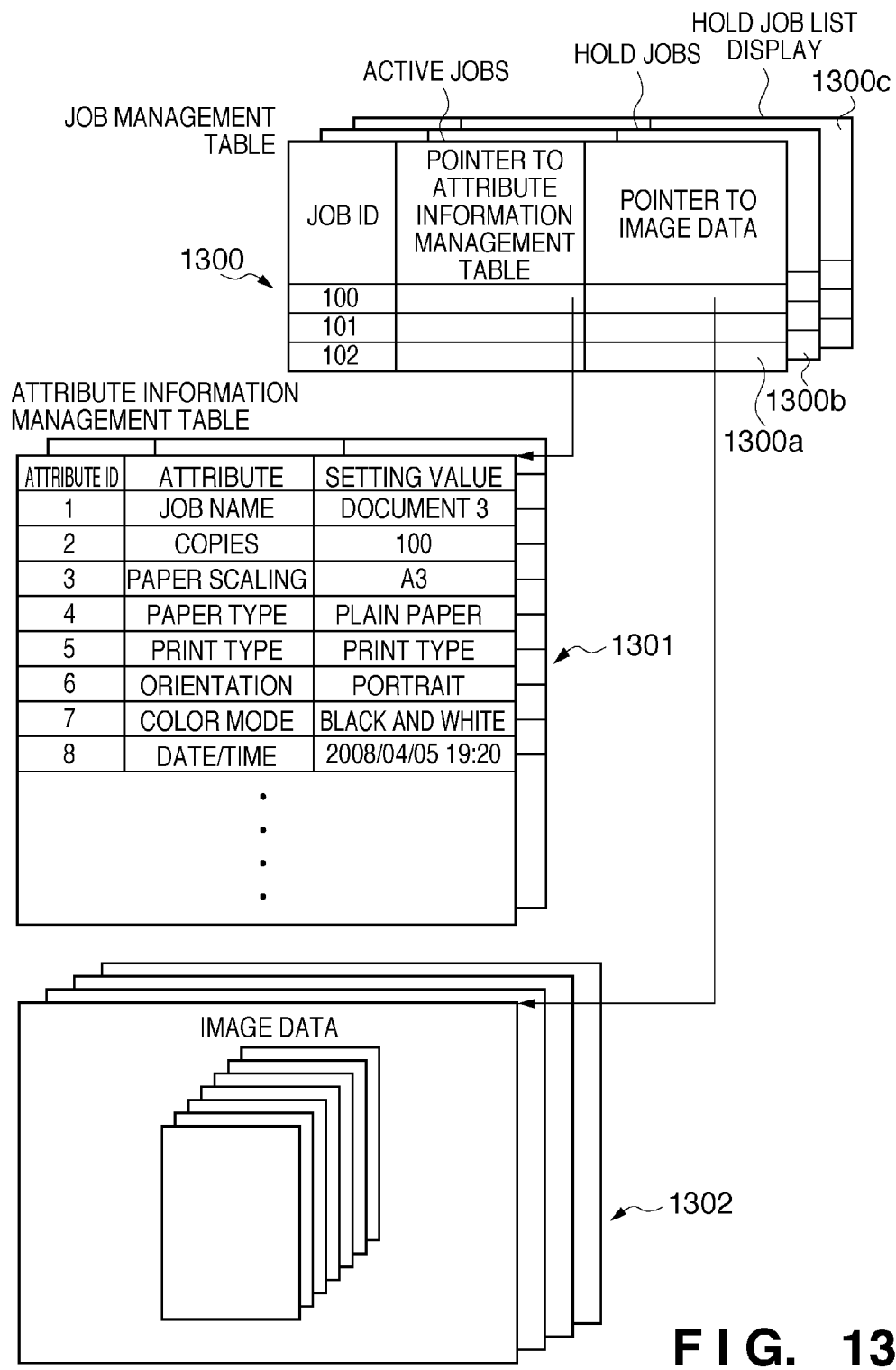
FIG. 13 is a diagram describing examples of tables for managing jobs of the MFP according to the present embodiment.

FIG. 13 is a diagram describing examples of tables for managing jobs of the MFP 100 according to the present embodiment. These tables are retained in the HDD 1500.

A job management table 1300 includes job IDs, pointers to an attribute information management table 1301, and pointers to image data 1302. A job ID is issued by the MFP controller 1000 in order to manage a corresponding job. Tables 1300a, 1300b, and 1300c, respectively for active jobs, hold jobs, and hold job list display exist in the job management table 1300. Upon detecting that either the "job name" button 901 or the "date/time" button 902 in FIG. 9 has been touched, the MFP controller 1000 decides a display format of the hold job list screen. Subsequently, based on the job management table 1300b for hold jobs, the job management table 1300c for hold job list display is reconstructed. Here, for example, an array order of job IDs of the job management table 1300c for hold job list display is changed in correspondence to a display order such as that denoted by reference numeral 1200 in FIG. 12. Therefore, by displaying print jobs according to the array order of the job management table 1300c for hold job list display, a list of held print jobs can be displayed in a display order changed by the most latest operation by the user. The attribute information management table 1301 stores the respective attributes of print jobs. In addition, an attribute ID corresponding to each print job and a setting value corresponding to the attribute ID are registered in the attribute information management table 1301. Moreover, image data 1302 is managed on a per-page basis for each print job.

FIG. 14 is a diagram describing an example of a user information management table for managing user information of the MFP 100 according to the present embodiment. The user information management table (array retaining unit) is also retained in the HDD 1500.

The user information management table includes user IDs, user names, passwords, and job list display formats. By default, "null" is stored in all user name and password fields, and any of "ascending order of date/time", "descending order of date/time", "ascending order of job name", and "descending order of job name" is stored in the job list display format fields. When "null" is stored in all user name and password fields, the MFP controller 1000 determines that a user name and a password have not been set for the MFP 100. On the other hand, if data other than "null" is stored, then the MFP controller 1000 determines that a user name and a password have been set.

If it is determined that a user name and a correct password have been inputted on the login screen represented by reference numeral 910 shown in FIG. 9, the MFP controller 1000 reads a job list display format associated with a user ID thereof from the HDD 1500. Subsequently, based on the job management table 1300b for hold jobs shown in FIG. 13, the job management table 1300c for hold job list display is reconstructed.

Next, a processing procedure of the MFP controller 1000 according to the present embodiment will be described in accordance with the flowcharts shown in FIGS. 15, 16A, and 16B.

Figure 15:
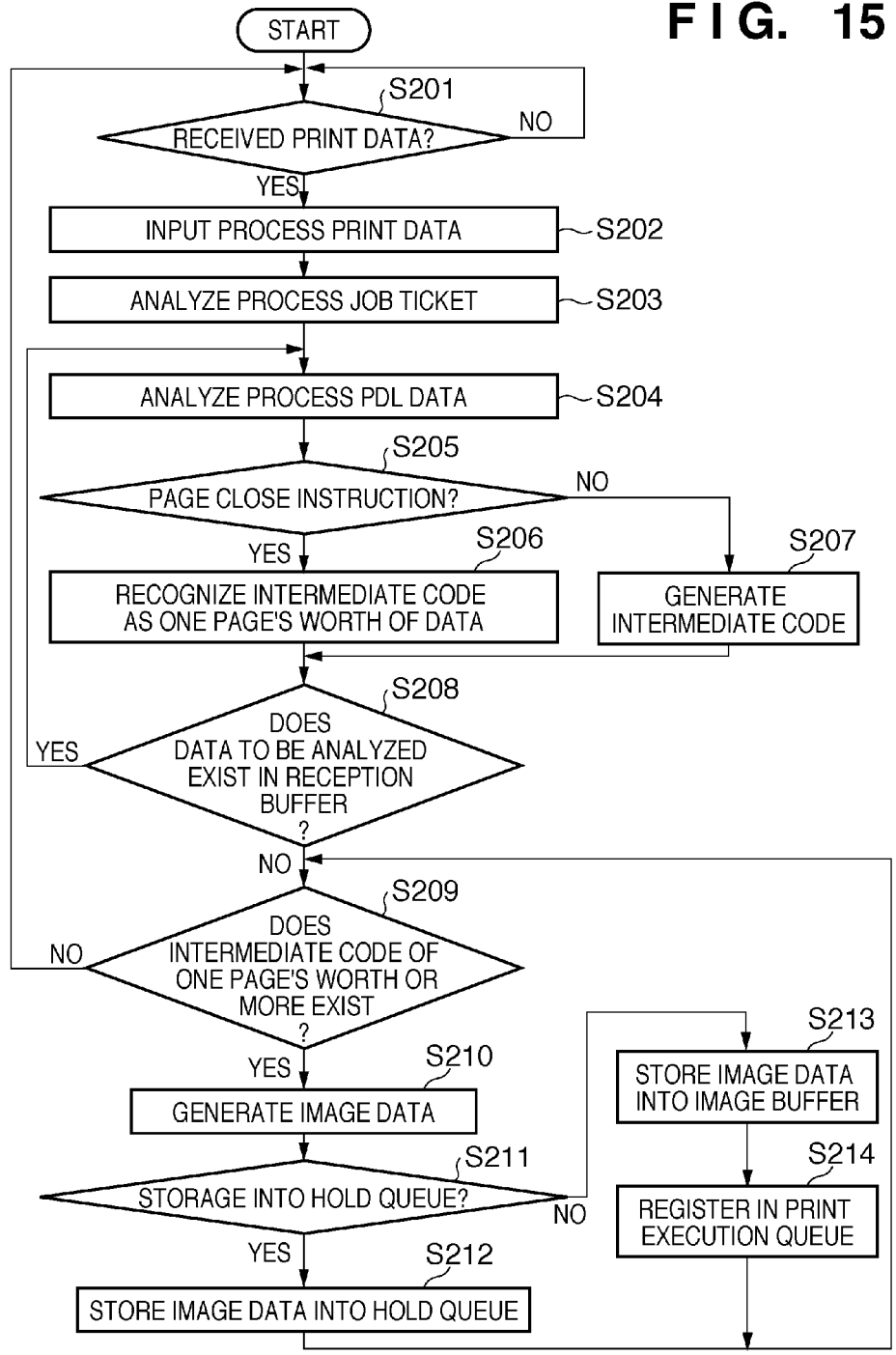
FIG. 15 is a flowchart describing processing by the MFP controller according to the present embodiment.

FIG. 15 is a flowchart describing processing by the MFP controller 1000 according to the present embodiment. A program that executes this processing is stored in the RAM 302 upon execution and is executed under the control of the CPU 301.

When the MFP 100 is powered on, in step S201, the MFP controller 1000 waits for print data to be received. When the MFP controller 1000 detects reception of the print data, the process proceeds to step S202 to perform input processing of the print data. The processing of the steps S201 and S202 is the processing of the network interface controller 1601 to be executed by the MFP controller 1000.

Next, the MFP controller 1000 advances processing to step S203 to execute the processing of the job ticket analyzer 1602 and analyze the inputted print data. As a result of the analysis, the MFP controller 1000 stores print data (PDL data) in the reception buffer 1610 of the HDD 1500. In addition, the MFP controller 1000 analyzes a job ticket to determine whether the job is for storage to the Hold queue 1612 or regular printing. If it is determined that the job is for storage to the Hold queue 1612, then the MFP controller 1000 performs processing for registering the job in the job management table 1300b for hold jobs. On the other hand, in the case that it is determined for the regular printing, since the job is to be registered as-is in the print execution queue, the MFP controller 1000 performs processing for registering the job in the job management table 1300a for active jobs.

The MFP controller 1000 next advances processing to step S204 to analyze PDL data stored in the reception buffer 1610 (details on PDL data analysis processing will be described later). Next, the MFP controller 1000 proceeds to step S205 to determine whether a command is a page close instruction or not (including checking whether the command is an instruction indicating the end of a single page). If the MFP controller 1000 determines that the command is the page close instruction, then the MFP controller 1000 advances processing to step S206 to perform processing for recognizing an intermediate code generated up to then as one page's worth of data. An intermediate code is to be managed on a per-page basis as described earlier.

On the other hand, if the MFP controller 1000 determines in step S205 that the command is other than the page close instruction, the MFP controller 1000 advances processing to step S207 and generates an intermediate code with a format suitable for internal processing in accordance with each command.

After executing either step S206 or step S207 in this manner, the MFP controller 1000 advances processing to step S208 and determines whether data to be analyzed exists in the reception buffer 1610 or not. If the MFP controller 1000 determines that data to be analyzed exists, then the process returns to step S204 to repeat the PDL data analysis processing. On the other hand, if the MFP controller 1000 determines that data to be analyzed does not exist in the reception buffer 1610, then the process advances to step S209. In step S209, the MFP controller 1000 determines whether an intermediate code of one page's worth or more exists or not. If the MFP controller 1000 determines that the intermediate code of one page's worth or more does not exist, then the MFP controller 1000 proceeds to the reception processing in step S201. If the MFP controller 1000 determines that the intermediate code of one page's worth or more exists, then the process proceeds to S210 to read the intermediate code of one page's worth from the intermediate buffer 1611 and perform processing for generating image data based on the intermediate code. The MFP controller 1000 next proceeds process to step S211 to determine whether or not the print job is a job for which storage in the Hold queue 1612 has been specified. In the case of a job for which storage in the Hold queue 1612 has been specified, the MFP controller 1000 advances processing to step S212 and stores the generated image data in the Hold queue 1612 secured in the HDD 1500.

On the other hand, if the MFP controller 1000 determines that the print job is a job for which storage in the Hold queue 1612 has not been specified, then the MFP controller 1000 advances processing to step S213. In step S213, the MFP controller 1000 stores one page's worth of image data in the image buffer 1613. The process then proceeds to step S214 to register the job ID of the page stored in the image buffer 1613 in the print execution queue if the stored page is a top page of a regular print job. At this point, if print processing of another job is not being performed or, in other words, if the job ID is registered to the top of the print execution queue, one page's worth of image data is read from the image buffer 1613. Subsequently, the MFP controller 1000 converts the image data into a video signal and commences processing for transferring the video signal to the printer controller 1607. Accordingly, the printer controller 1607 is to actually perform printing on a recording paper (sheet) based on the video signal and perform processing for discharging the printed recording paper to the outside of the MFP 100.

The video signal transfer to the printer controller 1607 and the storage processing to the image buffer 1613 are not synchronous. Normally, since a conversion rate to image data proceeds at a faster rate than the printing speed of the printer unit 160, image data of not yet printed pages gradually accumulate in the image buffer 1613.

After the processing of step S214 as described above, the process returns to step S209. When one page's worth of intermediate code has not been completed in step S209, the process further returns to step S201 to await subsequent input data.

Figure 16A:
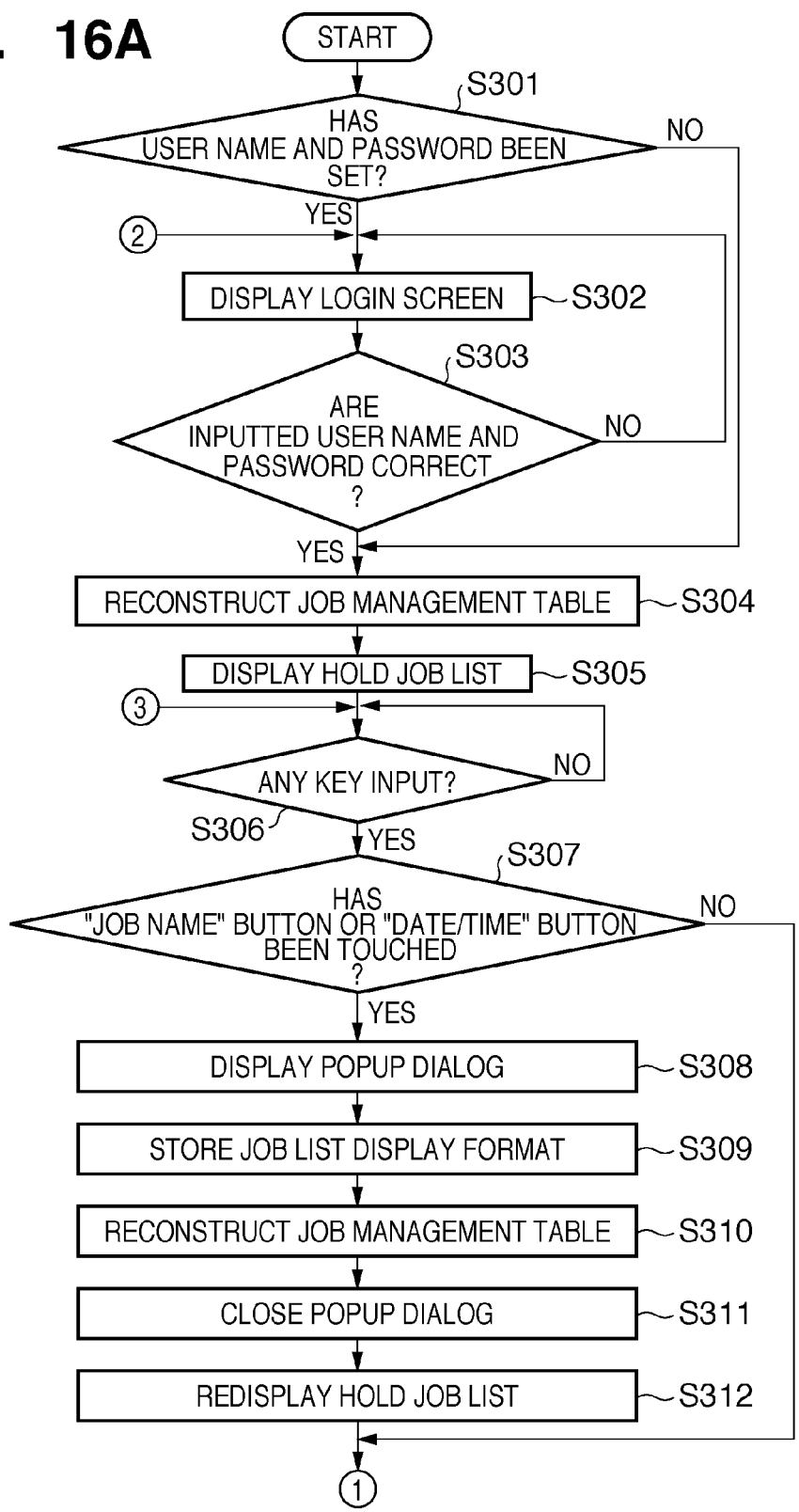

FIGS. 16A and 16B are flowcharts describing display processing of a hold job list by the MFP controller 1000 and processing in response to an input made on the touch panel by an operator, according to the present embodiment. The MFP controller 1000 executes the processing represented by the flowcharts shown in FIGS. 16A and 16B as separate tasks from the main processing shown in FIG. 15. A program that executes this processing is stored in the RAM 302 upon execution thereof and is executed under the control of the CPU 301.

First, in step S301, the MFP controller 1000 reads the user information management table shown in FIG. 14 from the HDD 1500 and determines whether a user name and a password have been set for the MFP 100. If the MFP controller 1000 determines that a user name and a password have not been set for the MFP 100, then the MFP controller 1000 omits input of a user name and a password and advances processing to step S304.

On the other hand, if the MFP controller 1000 determines that a user name and a password have been set for the MFP 100, then the MFP controller 1000 advances processing to step S302 to display a login screen as shown by numeral 910 in FIG. 9. The process proceeds to step S303, and the MFP controller 1000 determines whether the user name and the password inputted by the operator are correct or not. If correct, the MFP controller 1000 advances processing to step S304, but if not, the process returns to step S302.

In step S304, the MFP controller 1000 reconstructs the job management table 1300c for hold job list display based on the job management table 1300b for hold jobs in accordance with the job list display format of the user information management table. The process advances to step S305 to display a hold job list of the user in accordance with the information of the job management table 1300c for hold job list display.

Next, the MFP controller 1000 advances processing to step S306 to await key input. Upon detecting key input, the MFP controller 1000 advances processing to step S307. In step S307, based on location information of a touch by the operator from the console unit 1008, the MFP controller 1000 determines whether or not the "job name" button 901 or the "date/time" button 902 has been touched. Hereinafter, a simple expression such as "the MFP controller 1000 determines whether an "xxxx" button has been touched or not" shall be used. If the MFP controller 1000 detects that either the "job name" button 901 or the "date/time" button 902 has been touched, then the MFP controller 1000 advances processing to step S308 to display a popup dialog such as shown by numeral 10001 in FIG. 10A. In the popup dialog, based on the touched button and the job management table 1300c for hold job list display, a message is displayed which indicates that sort processing for sorting the order of the print job list display is in progress. The process advances to step S309, and the MFP controller 1000 decides a new job list display format from the type of the touched button and the job list display format stored in the user information management table, and stores a value thereof in the user information management table (FIG. 14). For example, if the "job name" button 901 has been touched and "descending order of job names" is registered as the job list display format of a corresponding user name, "descending order of job names" is replaced with "ascending order of job names". In addition, if the "date/time" button 902 has been touched and "ascending order of date/time" is registered as the job list display format of a corresponding user name, "ascending order of date/time" is replaced with "descending order of date/time".

The process proceeds to step S310, and the MFP controller 1000 reconstructs the job management table 1300c for hold job list display based on the job management table 1300b for hold jobs in accordance with the job list display format of the user information management table. Once sort processing is concluded in this manner, the MFP controller 1000 advances processing to step S311 to close the popup dialog. Subsequently, the process proceeds to step S312 to redisplay a hold job list in accordance with the information of the job management table 1300c for hold job list display, and the process proceeds to step S313 (FIG. 16B). Meanwhile, even if the MFP controller 1000 determines in step S307 that the touched button is neither the "job name" button 901 nor the "date/time" button 902, the MFP controller 1000 advances processing to step S313 (FIG. 16B).

In step S313, the MFP controller 1000 determines whether or not a print job has been selected. If the MFP controller 1000 determines that a print job has been selected, the MFP controller 1000 advances processing to step S314. In step S314, the MFP controller 1000 determines, for example, whether or not the "preview" button shown in FIG. 12 has been touched. If the MFP controller 1000 determines that the "preview" button has been touched, the MFP controller 1000 advances processing to step S315 to display a separate screen for previewing the top page of the selected job, and changes the display contents of the user interface screen (display change). The MFP controller 1000 advances processing to step S316 to determine whether or not a button for closing the separate screen for previewing has been touched. If the MFP controller 1000 determines that the button for closing the separate screen has been touched, the MFP controller 1000 advances processing to step S317. In step S317, the MFP controller 1000 reconstructs the job management table 1300c for hold job list display based on the job management table 1300b for hold jobs stored in the HDD 1500 in accordance with the job list display format (FIG. 14) of the user information management table. Next, the MFP controller 1000 advances processing to step S318 to close the separate screen. Subsequently, the MFP controller 1000 advances processing to step S319 to redisplay a hold job list in accordance with the information of the job management table 1300c for hold job list display, and the process proceeds to step S329. Accordingly, after the user interface screen is switched by an user operation and upon conclusion of processing by the user operation, display control is performed so that a job list screen is displayed in an array set prior to the user operation such as "preview", "test print", "print", "edit", or the like.

On the other hand, if it is determined that the "preview" button has not been touched in step S314, then the MFP controller 1000 advances processing to step S320 to determine whether the "test print" button has been touched or not. If the MFP controller 1000 determines that the "test print" button has been touched, then the MFP controller 1000 advances processing to step S321 to display a separate screen for setting test printing of the selected job. Next, the MFP controller 1000 advances processing to step S316 to determine whether or not a button for closing the separate screen for setting test printing has been touched.

On the other hand, if the MFP controller 1000 determines in step S320 that the "test print" button has not been touched, then the MFP controller 1000 proceeds to step S322 to determine whether or not the "print" button 903 has been touched. If the MFP controller 1000 determines that the "print" button has been touched, then the MFP controller 1000 advances processing to step S323 to commence print processing of the selected job. Next, the MFP controller 1000 advances processing to step S324 to display a separate screen for an active job list. Subsequently, the MFP controller 1000 advances processing to step S316 to determine whether or not a button for closing the separate screen for an active job list has been touched.

Moreover, if the MFP controller 1000 determines in step S322 that the "print" button 903 has not been touched, then the MFP controller 1000 proceeds processing to step S325 to determine whether or not the "edit" button has been touched. If the MFP controller 1000 determines that the "edit" button has been touched, then the MFP controller 1000 advances processing to step S326 to display a separate screen for job ticket editing. Subsequently, the MFP controller 1000 advances processing to step S316 to determine whether or not a button for closing the separate screen for job ticket editing has been touched.

Furthermore, if the MFP controller 1000 determines in step S325 that the "edit" button has not been touched, then the MFP controller 1000 proceeds processing to step S327 to determine whether or not the "delete" button has been touched. If the MFP controller 1000 determines that the "delete" button has been touched, then the MFP controller 1000 advances processing to step S328 to delete the selected job. More specifically, the MFP controller 1000 deletes relevant data from the job management table for hold jobs and erases image data of the Hold queue 1612.

On the other hand, if the MFP controller 1000 determines in step S313 that a print job has not been selected or determines in step S327 that the "delete" button has not been touched, then the MFP controller 1000 advances processing to step S329. In step S329, the MFP controller 1000 determines whether or not the "logout" button has been touched. If it is determined that the "logout" button has been touched, then the MFP controller 1000 returns processing to step S302 (FIG. 16A). On the other hand, if the MFP controller 1000 determines in step S329 that the "logout" button has not been touched, then the MFP controller 1000 returns to the processing of step S306 (FIG. 16A).

As described above, according to the present embodiment, a user operation regarding a print job is performed on a separate screen such as the test print setting screen which differs from the hold job list screen, and when subsequently returning to the hold job list screen for redisplay, the hold job list screen prior to the user operation can be restored. In other words, by storing a job list display format in the user information management table, when returning to an original list screen after switching to a different screen display, the user information management table can be referenced to enable display in the original job list display format. Accordingly, the operator can now easily find a desired print job from the job list display.

In addition, according to the present embodiment, even in a case where a printing apparatus is shared and used by a plurality of dedicated operators, by storing job list display formats in the user information management table, print jobs can now be list-displayed by each user in a desired display format.

Moreover, in the present embodiment, while an array change request has been described using a case where the "job name" button or the "date/time" button is specified, the present invention is not limited thereto. Alternatively, providing and specifying a button for size (data volume), file type, or the like shall suffice. In such a case, an array order of print jobs is to be changed in accordance with size or file type. In addition, the plurality of item buttons may be arranged so as to be specifiable, whereby a display order (array) may be changed by combining items of specified buttons.

Heretofore, an embodiment of the present invention has been described through an example in which the present invention is applied to an MFP or a multifunction peripheral as a printing apparatus. However, it should be obvious that an independent printing apparatus including a console unit and a large-capacity storage device described in the present embodiment shall also suffice.

Furthermore, in the present embodiment, means for authenticating a user has been described through an example of a password authentication method in which a user name and a password are inputted via the console unit 1008. However, other authentication processing may be applied to the printing apparatus, such as performing card authentication by having the operator set an IC card on a card reader and reading information on the IC card.

(Other Embodiments)

The present invention can also be achieved by having a program of software realizing the functions of the embodiment described above supplied directly or remotely to a system or an apparatus, and having a computer of the system or the apparatus read out and execute the supplied program. In this case, a program format need not necessarily be adhered to as long as the functions of the program are provided.

Therefore, a program code itself that is installed to the computer in order to have the functions and processing of the present invention realized through the computer also achieves the present invention. In other words, the claims of the present invention also include a computer-executable program itself for realizing the functions and processing of the present invention. In this case, as long as the functions of the program are provided, the format of the program is irrelevant and may be an object code, an interpreter-executed program, script data to be supplied to an OS, and the like.

In addition, the present invention can also be achieved by modes other than realizing the functions of the embodiment described above by having a computer read out and execute a program. For example, the functions of the embodiment described above can be realized by having an OS or the like running on a computer perform a part or all of the actual processing based on instructions of the program.

Furthermore, a program read out from a storage medium may be arranged to be written into a memory provided on an expansion board inserted into a computer or on an expansion unit connected to the computer. In this case, subsequently, a CPU or the like provided on the expansion board or the expansion unit performs a part of or all of the actual processing based on instructions contained in the program, whereby the functions of the embodiment described earlier are realized by such processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2008-172646, filed Jul. 1, 2008, which is hereby incorporated by reference herein in its entirety.

What is claimed is:

1. A printing apparatus comprising:
    a storage unit configured to store a plurality of items of image data to be printed by a printing unit;
    a display control unit configured to cause a display unit to display a first list of the plurality of items of image data stored in the storage unit, wherein the plurality of items of image data are arranged in a first display order in the first list; and
    an acceptance unit configured to accept an instruction for instructing to change a display order of the plurality of items of image data displayed on the display unit into a second display order being different from the first display order;
    wherein the display control unit configured to cause the display unit to display a second list of the plurality of items of image data in a case that the acceptance unit accepts the instruction, wherein the plurality of items of image data are arranged in the second display order in the second list;
    wherein the display control unit configured to cause the display unit to display a setting screen for setting of a print setting of image data among the plurality of items of image data displayed in the first or second list, in a case that a print instruction for instructing to print the image data is received; and
    wherein when the setting screen is closed, the display control unit configured to cause the display unit to display the first list if the first list was displayed upon receiving the print instruction and to display the second list if the second list was displayed upon receiving the print instruction.

2. The printing apparatus according to claim 1, wherein the storage unit is a hard disk drive (HDD) unit.

3. The printing apparatus according to claim 1, further comprising:
    an authentication unit configured to authenticate a user; and
    a holding unit configured to hold a display order of the plurality of items of image data displayed on the display unit in associated with information of the user authenticated by the authentication unit,
    wherein the display control unit causes the display unit to display a list of the plurality of items of image data in the display order, associated with a user, held in the holding unit, in a case that the authentication unit has authenticated the user.

4. The printing apparatus according to claim 1, further comprising a dialog display unit configured to cause the display unit to display a dialog for indicating a state in which a display order of the plurality of items of image data are being changed in a case that the acceptance unit accepts the instruction.

5. The printing apparatus according to claim 1, further comprising a printing unit configured to print image data stored in the storage unit.

6. The printing apparatus according to claim 1, wherein the display order of the plurality of items of image data is an ascending order or a descending order.

7. A method of controlling a printing apparatus, comprising:
    storing a plurality of items of image data to be printed by a printing unit into a storage unit;
    displaying a first list of the plurality of items of image data stored in the storage unit on a display unit, wherein the plurality of items of image data are arranged in a first display order in the first list;
    accepting an instruction for instructing to change a display order of the plurality of items of image data displayed on the display unit into a second display order;
    displaying a second list of the plurality of items of image data in a case that the instruction is accepted, wherein the plurality of items of image data are arranged in the second display order in the second list;
    displaying a setting screen for setting a print setting for printing image data among the plurality of items of image data displayed in the first or second list on the display unit, in a case that a print instruction for printing the image data is received; and
    when the setting screen is closed, displaying the first list if the first list was displayed upon receiving the print instruction, and displaying the second list if the second list was displayed upon receiving the print instruction.

8. The method according to claim 7, wherein the storage unit is a hard disk drive (HDD) unit.

9. The method according to claim 7, further comprising;
    printing image data stored in the storage unit.

10. The method according to claim 7, further comprising;
    authenticating a user;
    holding a display order of the plurality of items of image data displayed on the display unit in associated with information of the authenticated user; and
    displaying a list of the plurality of items of image data in the held display order, associated with a user, in a case that the user has been authenticated.

* * * * *